(12) United States Patent
Kawasaki et al.

(10) Patent No.: US 8,789,500 B2
(45) Date of Patent: Jul. 29, 2014

(54) SPARK IGNITION TYPE INTERNAL COMBUSTION ENGINE

(75) Inventors: Takashi Kawasaki, Susono (JP);
Yukihiro Nakasaka, Suntou-gun (JP);
Yoshihiro Sakayanagi, Mishima (JP);
Hiroyuki Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 11 days.

(21) Appl. No.: 13/505,408

(22) PCT Filed: Jan. 28, 2010

(86) PCT No.: PCT/JP2010/051544
§ 371 (c)(1),
(2), (4) Date: May 1, 2012

(87) PCT Pub. No.: WO2011/092868
PCT Pub. Date: Aug. 4, 2011

(65) Prior Publication Data
US 2012/0279476 A1 Nov. 8, 2012

(51) Int. Cl.
*F02B 1/00* (2006.01)
*F02B 75/04* (2006.01)
*F01L 1/34* (2006.01)

(52) U.S. Cl.
USPC .... 123/78 R; 123/48 R; 123/48 C; 123/90.15

(58) Field of Classification Search
USPC .......................... 123/78 R, 48 R, 48 C, 90.15
See application file for complete search history.

(56) References Cited

U.S. PATENT DOCUMENTS

| 2006/0070605 A1* | 4/2006 | Akihisa et al. ................. 123/478 |
| 2007/0095313 A1* | 5/2007 | Kamiyama et al. ........ 123/90.16 |
| 2009/0187329 A1 | 7/2009 | Akihisa et al. |
| 2009/0276140 A1 | 11/2009 | Akihisa et al. |

FOREIGN PATENT DOCUMENTS

| JP | A-2004-218522 | 8/2004 |
| JP | A-2007-303423 | 11/2007 |
| JP | A-2007-321589 | 12/2007 |
| JP | A-2008-25540 | 2/2008 |
| JP | A-2008-309161 | 12/2008 |

OTHER PUBLICATIONS

International Search Report mailed Mar. 9, 2010 issued in International Patent Application No. PCT/JP2010/051544 (with translation).

* cited by examiner

*Primary Examiner* — Lindsay Low
*Assistant Examiner* — Charles Brauch
(74) *Attorney, Agent, or Firm* — Oliff PLC

(57) ABSTRACT

An internal combustion engine which is provided with a variable compression ratio mechanism which can change a mechanical compression ratio and a variable valve timing mechanism which can control a closing timing of an intake valve. A target operating point which can be reached after a fixed time without entering no-entry regions from the current operating point toward an operating point which satisfies the demanded intake air amount is calculated for an operating point which shows a combination of the mechanical compression ratio and the closing timing of the intake valve when the demanded intake air amount changes, and the mechanical compression ratio and the closing timing of the intake valve are made to change toward this target operating point.

10 Claims, 26 Drawing Sheets

Fig.6
(A)
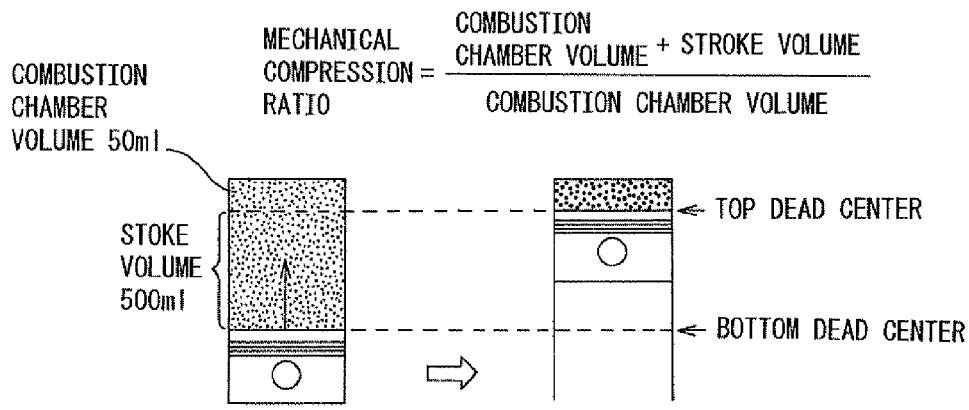
(B)
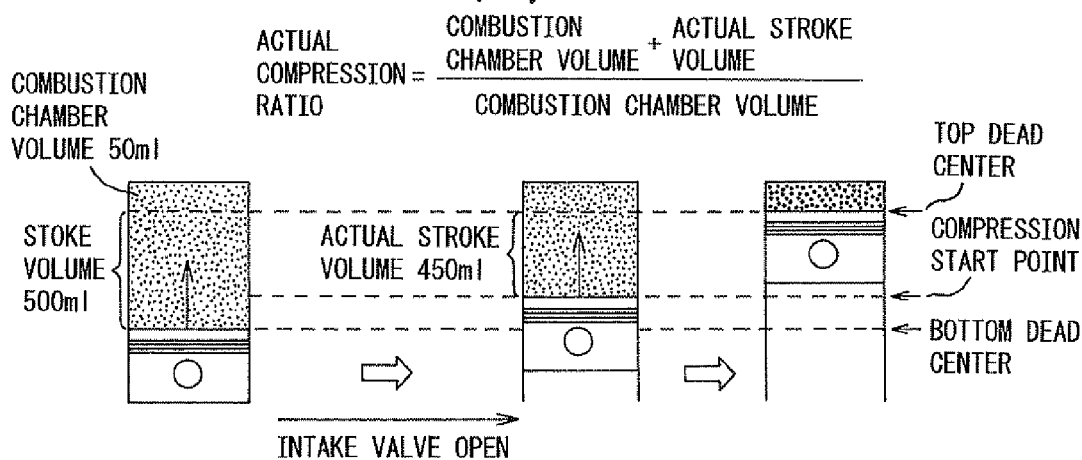
(C)
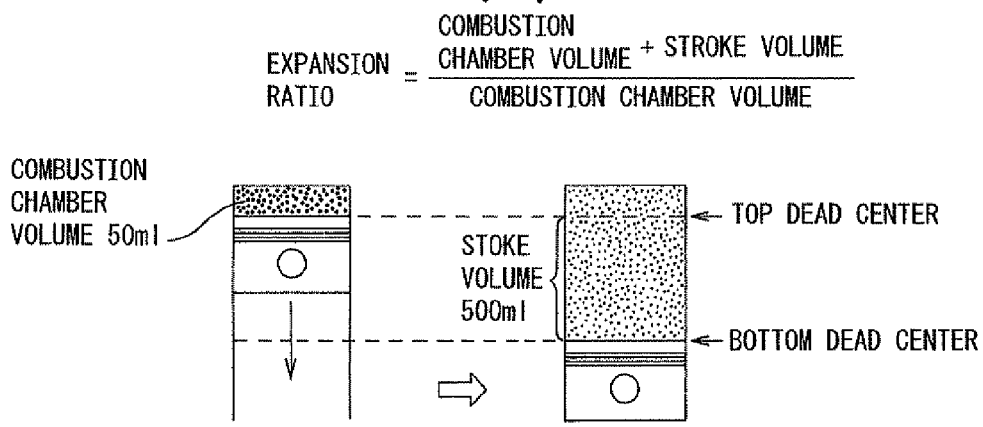

Fig.12
(A)
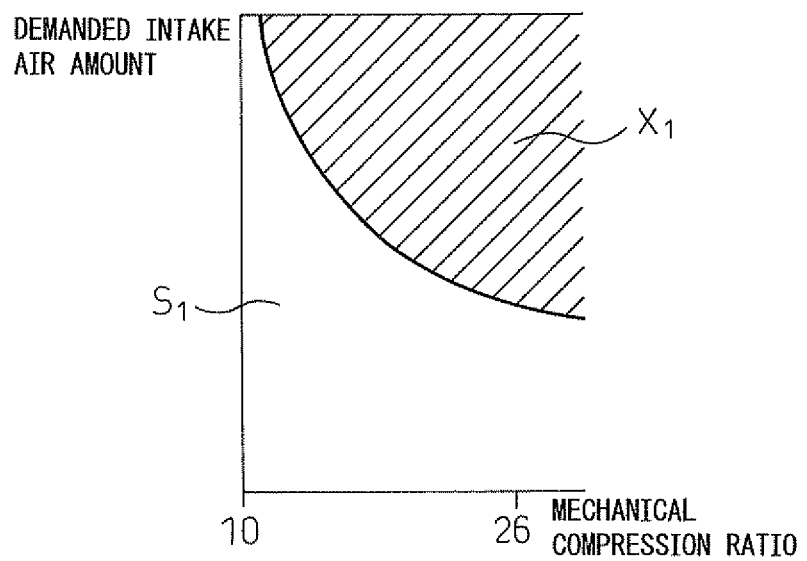
(B)
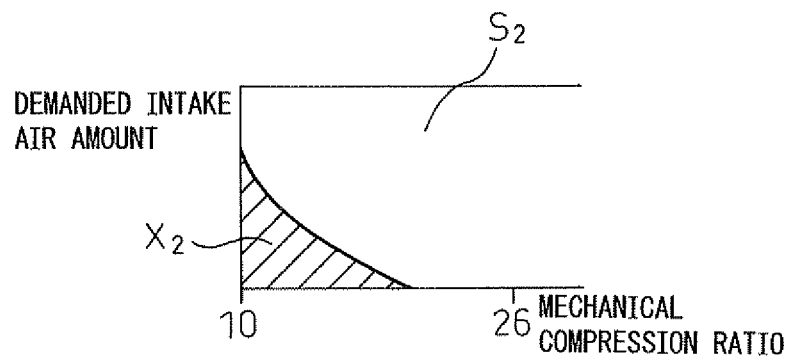

SPARK IGNITION TYPE INTERNAL COMBUSTION ENGINE

TECHNICAL FIELD

The present invention relates to a spark ignition type internal combustion engine.

BACKGROUND ART

Known in the art is a spark ignition type internal combustion engine which is provided with a variable compression ratio mechanism which can change the mechanical compression ratio and a variable valve timing mechanism which can control a closing timing of an intake valve and which is designed to maintain an actual compression ratio substantially constant regardless of an engine load (see, for example, Patent Literature 1). In this internal combustion engine, as the engine load becomes higher, that is, as the demanded intake air amount becomes greater, the closing timing of the intake valve is advanced to approach intake bottom dead center. At this time, to maintain the actual compression ratio substantially constant, the mechanical compression ratio is made to drop as the demanded intake air amount becomes greater.

CITATIONS LIST

Patent Literature

Patent Literature 1: Japanese Patent Publication (A) No. 2007-303423

SUMMARY OF INVENTION

Technical Problem

In this regard, if making the closing timing of the intake valve and the mechanical compression ratio change in accordance with the demanded intake air amount in this way, usually the speeds by which the closing timing of the intake valve and the mechanical compression ratio can be made to change differ. Generally speaking, making the mechanical compression ratio change requires more time than making the closing timing of the intake valve change. Therefore, for example, when the demanded intake air amount increases, the speed of advance of the closing timing of the intake valve becomes faster than the speed of drop of the mechanical compression ratio and therefore the intake air amount is made to increase while the mechanical compression ratio is high. As a result, the problem arises that the compression end pressure in the combustion chamber becomes higher and therefore knocking occurs.

As opposed to this, if slowly making the closing timing of the intake valve advance when the demanded intake air amount increases, the problem arises that the intake air amount will only slowly increase and as a result it is not possible to secure an acceleration operation with good response.

On the other hand, if rapidly making the closing timing of the intake valve advance when the demanded intake air amount decreases, the problem arises that the intake air amount decreases before the mechanical compression ratio becomes high and as a result the compression end pressure becomes lower, so good combustion can no longer be obtained. As opposed to this, if slowly retarding the closing timing of the intake valve when the demanded intake air amount decreases, there is the problem that a deceleration operation with good response cannot be secured.

That is, to secure an acceleration operation with good response when the demanded intake air amount changes, it becomes necessary to change the closing timing of the intake valve as fast as possible while securing good combustion. However, in the above internal combustion engine, this is not considered at all.

An object of the present invention is to provide a spark ignition type internal combustion engine which can secure a good response operation while maintaining good combustion when the demanded intake air amount is changed.

Solution to Problem

According to the present invention, there is provided a spark ignition type internal combustion engine comprising a variable compression ratio mechanism which can change a mechanical compression ratio and a variable valve timing mechanism which can control a closing timing of an intake valve, wherein a no-entry region for a combination of a mechanical compression ratio and a closing timing of an intake valve is set, an operating point showing the combination of the mechanical compression ratio and the closing timing of the intake valve is prohibited from entering the no-entry region, and when a demanded intake air amount changes, a target operating point which can be reached after a fixed time without entering the no-entry region from a current operating point toward are operating point which satisfies the demanded intake air amount is calculated to thereby make the mechanical compression ratio and the closing timing of the intake valve change toward the target operating point.

Advantageous Effects of Invention

To secure good response operation when the demanded intake air amount changes, it is preferable to make the operating point of the mechanical compression ratio and the closing timing of the intake valve change as fast as possible until the operating point which satisfies the demanded intake air amount. However, if the operating point enters the no-entry region at this time, combustion ends up deteriorating. Therefore, in the present invention, first, a target operating point not entering a no-entry region is calculated, then the mechanical compression ratio and the closing timing of the intake valve are made to change toward the thus calculated target operating point. If doing this, an operating point which satisfies the demanded intake air amount can be reached quickly without the operating point entering a no-entry region and therefore a good response operation becomes possible while securing good combustion.

BRIEF DESCRIPTION OF THE DRAWINGS

FIG. 6 is a view for explaining a mechanical compression ratio, actual compression ratio, and expansion ratio.

FIG. 12 is a view which shows a no-entry region.

DESCRIPTION OF EMBODIMENTS

Figure 1:
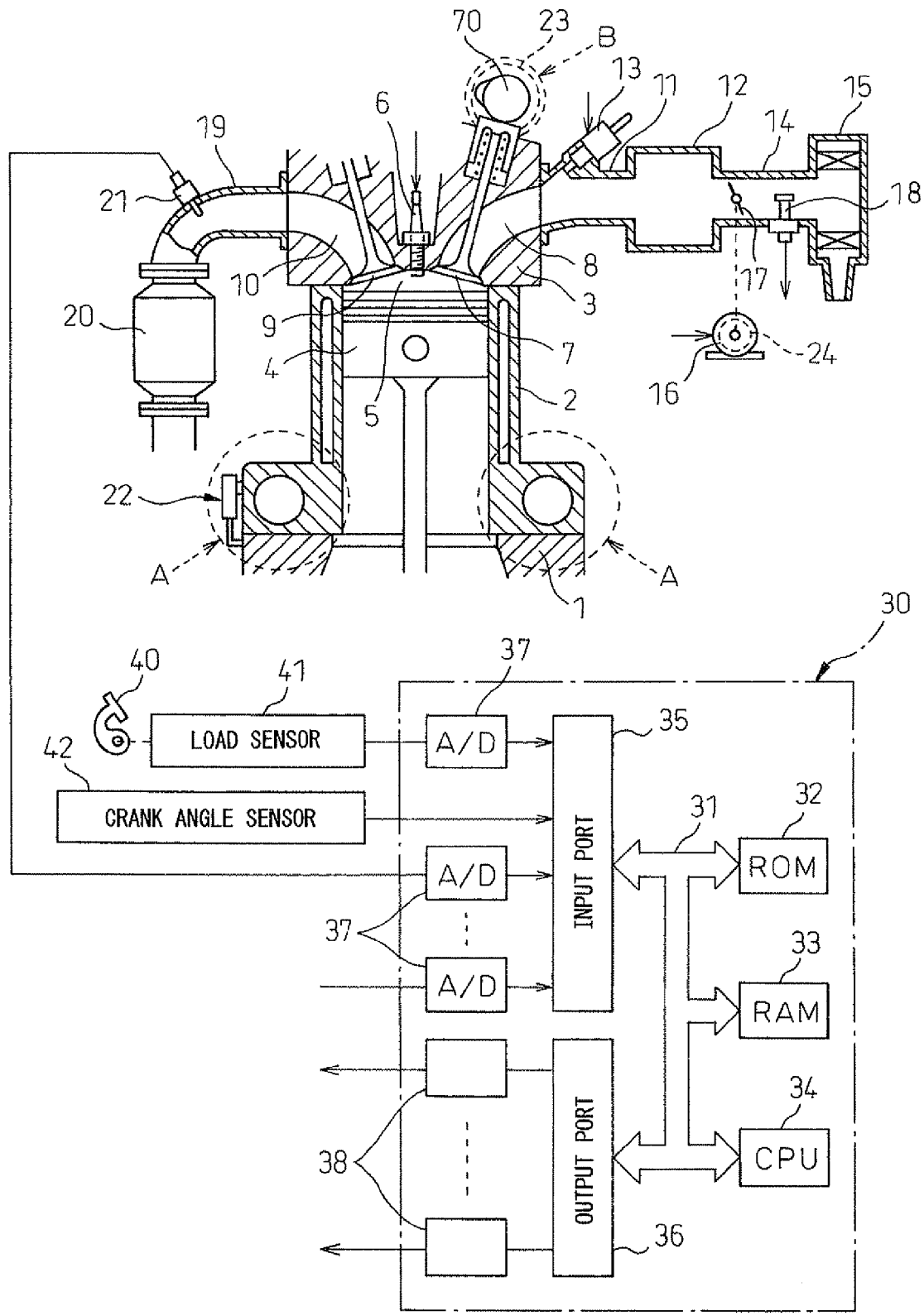
FIG. 1 is an overview of a spark ignition type internal combustion engine.

FIG. 1 is a side cross-sectional view of a spark ignition type internal combustion engine.

Referring to FIG. 1, 1 indicates a crankcase, 2 a cylinder block, 3 a cylinder head, 4 a piston, 5 a combustion chamber, 6 a spark plug which is arranged at a center of a top face of a combustion chamber 5, 7 an intake valve, 8 an intake port, 9 an exhaust valve, and 10 an exhaust port. Each intake port 8 is connected through an intake branch pipe 11 to a surge tank 12. At each intake branch pipe 11, a fuel injector 13 which injects fuel toward the corresponding intake port 8 is arranged. Note that, the fuel injectors 13 may also be arranged inside the combustion chambers 5 instead of being attached to the intake branch pipes 11.

The surge tank 12 is connected through an intake duct 14 to an air cleaner 15. Inside of the intake duct 14, a throttle valve 17 which is driven by an actuator 16 and an intake air amount detector 18 which uses for example a hot wire are arranged. On the other hand, each exhaust port 10 is connected through an exhaust manifold 19 to a catalytic converter 20 which holds a for example three-way catalyst. Inside the exhaust manifold 19, an air-fuel ratio sensor 21 is arranged.

On the other hand, in the embodiment which is shown in FIG. 1, at a connecting part of the crankcase 1 and the cylinder block 2, a variable compression ratio mechanism A which can make the relative positions of the crankcase 1 and the cylinder block 2 change in the cylinder axis direction so as to change the volume of a combustion chamber 5 when the piston 4 is positioned at compression top dead center is provided. Furthermore, an actual compression action start timing changing mechanism B which can change a start timing of the actual compression action is provided. Note that, in the embodiment which is shown in FIG. 1, this actual compression action start timing changing mechanism B is comprised of a variable valve timing mechanism which can control the closing timing of the intake valve 7.

As shown in FIG. 1, the crankcase 1 and the cylinder block 2 have attached to them a relative position sensor 22 for detecting a relative positional relationship between the crankcase 1 and the cylinder block 2. This relative position sensor 22 outputs an output signal which shows the change in the distance between the crankcase 1 and the cylinder block 2. Further, a valve timing sensor 23 which generates an output signal showing a closing timing of each intake valve 7 is attached to the variable valve timing mechanism B, while a throttle opening degree sensor 24 which generates an output signal showing a throttle valve opening degree is attached to the throttle valve drive-use actuator 16.

An electronic control unit 30 is comprised of a digital computer which is provided with a ROM (read only memory) 32, RAM (random access memory) 33, CPU (microprocessor) 34, input port 35, and output port 36, which are connected to each other by a bidirectional bus 31. The output signals of the intake air amount detector 18, the air-fuel ratio sensor 21, relative position sensor 22, valve timing sensor 23, and throttle opening degree sensor 24 are input through corresponding AD converters 37 to the input port 35. Further, an accelerator pedal 40 is connected to a load sensor 41 which generates an output voltage which is proportional to the amount of depression L of the accelerator pedal 40. The output voltage of the load sensor 41 is input through the corresponding AD converter 37 to the input port 35. Furthermore, the input port 35 is connected to a crank angle sensor 42 which generates an output pulse every time a crankshaft rotates by for example 30°. On the other hand, the output port 36 is connected through the corresponding drive circuits 38 to the spark plugs 6, fuel injectors 13, throttle valve drive-use actuator 16, and variable compression ratio mechanism A and variable valve timing mechanism B.

Figure 2:
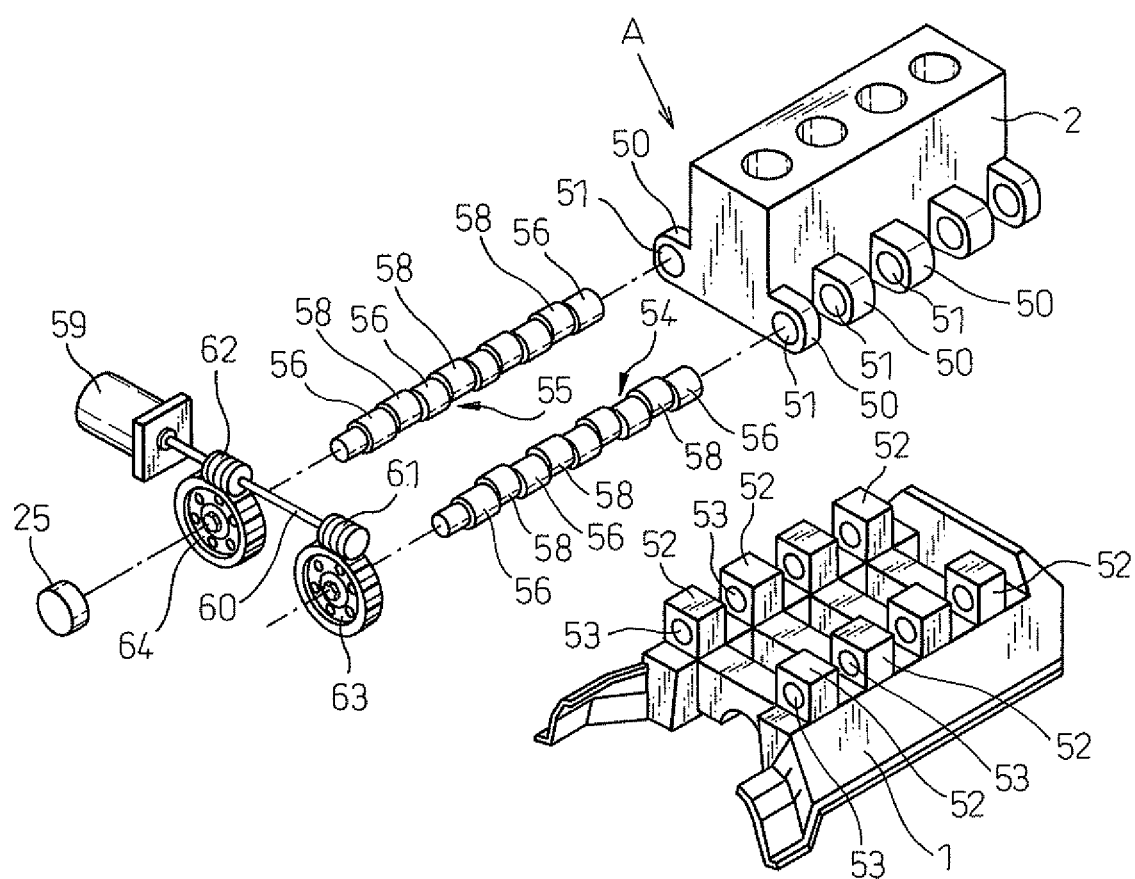
FIG. 2 is a disassembled perspective view of a variable compression ratio mechanism.
Figure 3:
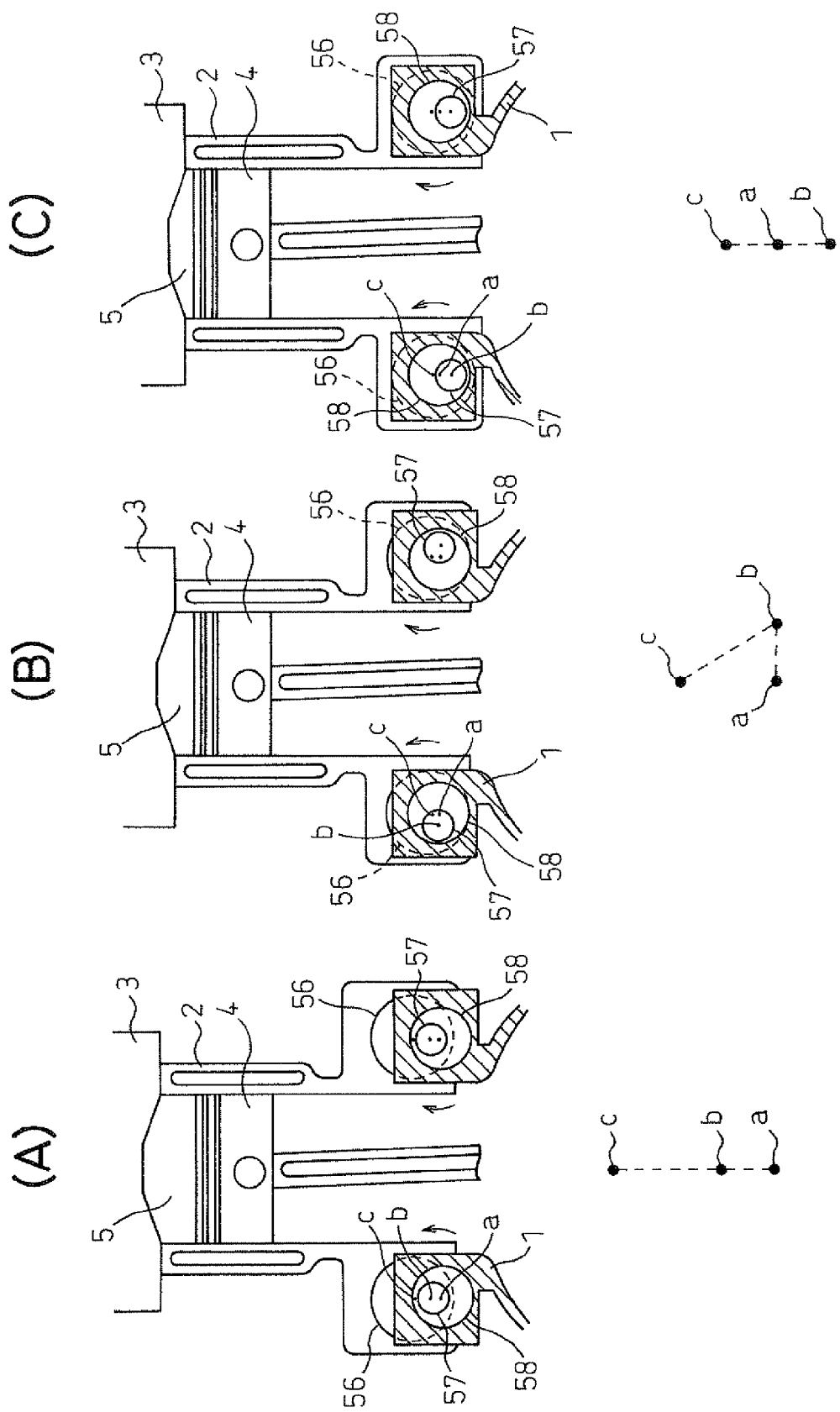
FIG. 3 is a side cross-sectional view of an internal combustion engine expressed schematically.

FIG. 2 is a disassembled perspective view of the variable compression ratio mechanism A which is shown in FIG. 1, while FIG. 3 is a side cross-sectional view of an internal combustion engine expressed schematically. Referring to FIG. 2, a plurality of projections 50 are formed at intervals from each other at the bottom of the two side walls of the cylinder block 2. In the projections 50, cam holes 51 with circular cross-sections are formed. On the other hand, on the top surface of the crankcase 1, a plurality of projections 52 are formed at intervals from each other to fit between the corresponding projections 50. Inside these projections 52 as well, cam holes 53 with circular cross-sections are formed.

As shown in FIG. 2, a pair of camshafts 54 and 55 are provided. On the camshafts 54 and 55, circular cams 58 which are to be inserted rotatably in the cam holes 53 are fastened at every other position. These circular cams 58 are coaxial with the axes of rotation of the camshafts 54 and 55. On the other hand, at both sides of each circular cam 58, as shown in FIG. 3, eccentric shafts 57 are arranged eccentrically with respect to the axes of rotation of the camshafts 54 and 55. On the eccentric shafts 57, separate circular cams 56 are attached rotatably in an eccentric manner. As shown in FIG. 2, these circular cams 56 are arranged at the two sides of each circular cam 58. These circular cams 56 are inserted inside the corresponding cam holes 51 in a rotatable manner. Further, as shown in FIG. 2, a cam angle sensor 25 which generates an output signal showing the rotational angle of the camshaft 55 is attached to the camshaft 55.

If the circular cams 58 which are fastened to the camshafts 54 and 55 are made to rotate in opposite directions as shown by the arrows in FIG. 3(A) from the state which is shown in FIG. 3(A), the eccentric shafts 57 move in opposite directions, so the circular cams 56 rotate in opposite directions from the circular cams 58 in the cam holes 51 and, as shown in FIG. 3(B), the positions of the eccentric shafts 57 change from high positions to intermediate height positions. Next, furthermore, if making the circular cams 58 rotate in the direction shown by the arrow, as shown in FIG. 3(C), the eccentric shafts 57 become the lowest position.

Note that, FIG. 3(A), FIG. 3(B), and FIG. 3(C) show the positional relationship between a center "a" of the circular cam 58, a center "b" of the eccentric shaft 57, and a center "c" of the circular cam 56 in the respective states.

As will be understood from a comparison with FIG. 3(A) to FIG. 3(C), the relative positions of the crankcase 1 and the cylinder block 2 are determined by the distance between the center "a" of the circular cam 58 and the center "c" of the circular cam 56. The larger the distance between the center "a" of the circular cam 58 and the center "c" of the circular cam 56, the further the cylinder block 2 from the crankcase 1. That is, the variable compression ratio mechanism A makes the relative position between the crankcase 1 and the cylinder block 2 change by a crank mechanism which uses a rotating cam. If the cylinder block 2 moves away from the crankcase 1, the volume of the combustion chamber 5 when the piston 4 is positioned at compression top dead center increases, therefore by making the camshafts 54 and 55 rotate, the volume of the combustion chamber 5 when the piston 4 is positioned at compression top dead center can be changed.

As shown in FIG. 2, to make the cam shafts 54 and 55 rotate in opposite directions, the shaft of a drive motor 59 is provided with a pair of worm gears 61 and 62 with opposite thread directions. Gears 63 and 64 engaging with these worm gears 61 and 62 are fastened to ends of the cam shafts 54 and 55. In this embodiment, by driving the drive motor 59, the volume of a combustion chamber 5 when the piston 4 is positioned at compression top dead center can be changed over a broad range.

Figure 4:
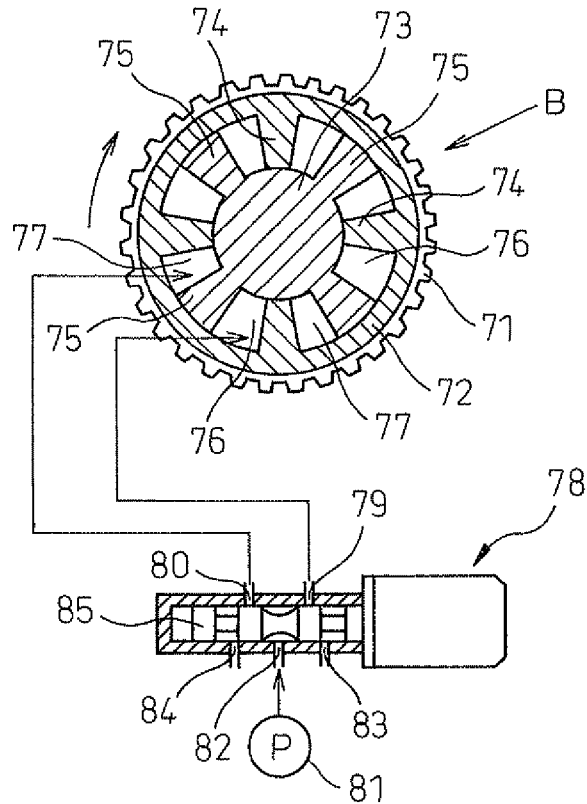
FIG. 4 is a view which shows a variable valve timing mechanism.

On the other hand, FIG. 4 shows a variable valve timing mechanism B which is attached to the end of a cam shaft 70 for driving the intake valve 7 in FIG. 1. Referring to FIG. 4, this variable valve timing mechanism B is provided with a timing pulley 71 which is rotated by an engine crankshaft through a timing belt in the arrow direction, a cylindrical housing 72 which rotates together with the timing pulley 71, a shaft 73 which rotates together with the camshaft 70 for driving the intake value and can rotate relative to the cylindrical housing 72, a plurality of partitions 74 which extend from an inside circumference of the cylindrical housing 72 to an outside circumference of the shaft 73, and vanes 75 which extend between the partitions 74 from the outside circumference of the shaft 73 to the inside circumference of the cylindrical housing 72. Hydraulic chambers 76 for advancing use and hydraulic chambers 77 for retarding use are formed on the two sides of the vanes 75.

The feed of working oil to the hydraulic chambers 76 and 77 is controlled by a working oil feed control valve 78. This working oil feed control valve 78 is provided with hydraulic ports 79 and 80 which are connected to the hydraulic chambers 76 and 77, a feed port 82 for working oil which is discharged from a hydraulic pump 81, a pair of drain ports 83 and 84, and a spool valve 85 for controlling connection and disconnection of the ports 79, 80, 82, 83, and 84.

When the phase of a cam of the camshaft 70 for driving the intake valve should be advanced, in FIG. 4, the spool valve 85 is made to move to the right, the working oil which is fed from the feed port 82 is fed through the hydraulic port 79 to the hydraulic chambers 76 for advancing use and the working oil in the hydraulic chambers 77 for retarding use is exhausted from the drain port 84. At this time, the shaft 73 is made to rotate relative with respect to the cylindrical housing 72 in the arrow direction.

As opposed to this, when the phase of a cam of the camshaft 70 for driving the intake valve should be retarded, in FIG. 4, the spool valve 85 is made to move to the left, the working oil which is fed from the feed port 82 is fed through the hydraulic port 80 to the hydraulic chambers 77 for retarding use, and the working oil in the hydraulic chambers 76 for advancing use is exhausted from the drain port 83. At this time, the shaft 73 is made to rotate relative with respect to the cylindrical housing 72 in the opposite direction to the arrow.

When the shaft 73 is made to rotate relative with respect to the cylindrical housing 72, if the spool valve 85 is returned to the neutral position which is shown in FIG. 4, the relative rotational operation of the shaft 73 is made to stop. The shaft 73 is held at the relative rotational position at that time. Therefore, the variable valve timing mechanism B can be used to make the phase of a cam of the camshaft 70 for driving the intake valve advance or be retarded by exactly a desired amount.

Figure 5:
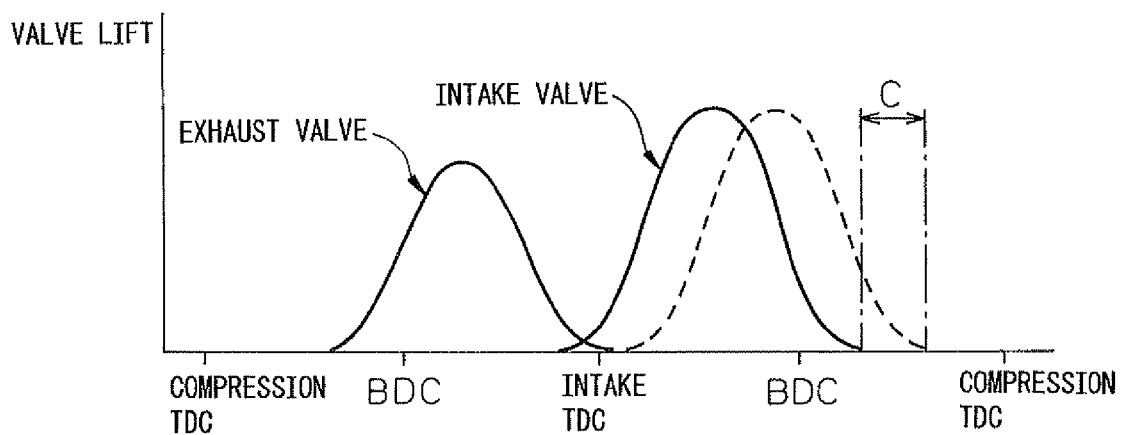
FIG. 5 is a view which shows an amount of lift of an intake valve and exhaust valve.

In FIG. 5, the solid line shows the time when the phase of a cam of the intake valve drive-use camshaft 70 is advanced the most, while the broken line shows when the phase of a cam of the intake valve drive-use camshaft 70 is retarded the most by the variable valve timing mechanism B. Therefore, the opening time period of the intake valve 7 can be set to any range of the region shown by the solid line in FIG. 5 and the range shown by the broken line, therefore the closing timing of the intake valve 7 can also be set to any crank angle in the range shown by the arrow "c" in FIG. 5.

The variable valve timing mechanism B which is shown in FIG. 1 and FIG. 4 shows one example. For example, it is possible to use a variable valve timing mechanism which changes only the closing timing of the intake valve while maintaining the opening timing of the intake valve constant or various other types of variable valve timing mechanisms.

Next, referring to FIG. 6, the meanings of the terms which are used in the present application will be explained. Note that, FIGS. 6(A), (B), and (C) show an engine where the combustion chamber volume is 50 ml and the stroke volume of the piston is 500 ml for the explanation. In these FIGS. 6(A), (B), and (C), "combustion chamber volume" means the volume of a combustion chamber when a piston is positioned at compression top dead center.

FIG. 6(A) explains the mechanical compression ratio. The mechanical compression ratio is a value which is mechanically determined from only the stroke volume of the piston and the combustion chamber volume at the time of a compression stroke. This mechanical compression ratio is expressed by (combustion chamber volume+stroke volume)/combustion chamber volume. In the example which is shown in FIG. 6(A) this mechanical compression ratio becomes (50 ml+500 ml)/50 ml=11.

FIG. 6(B) explains the actual compression ratio. This actual compression ratio is a value which is determined from the actual piston stroke volume and the combustion chamber volume when the compression action is actually started to when a piston reaches top dead center. This actual compression ratio is expressed by (combustion chamber volume+actual stroke volume)/combustion chamber volume. That is, as shown in FIG. 6(B), in the compression stroke, even if the piston starts to rise, no compression action is performed while the intake valve is open. The actual compression action is started after the intake valve closes. Therefore, the actual compression ratio is expressed as follows using the actual stroke volume. In the example which is shown in FIG. 6(B), the actual compression ratio becomes (50 ml+450 ml)/50 ml=10.

FIG. 6(C) explains the expansion ratio. The expansion ratio is a value which is determined from the stroke volume of the piston and the combustion chamber volume at the expansion stroke. This expansion ratio is expressed by the (combustion chamber volume+stroke volume)/combustion chamber volume. In the example which is shown in FIG. 6(C), this expansion ratio becomes (50 ml+500 ml)/50 ml=11.

Next, referring to FIG. 7 and FIG. 8, a superexpansion ratio cycle which is used in the present invention will be explained. Note that, FIG. 7 shows the relationship between the theoretical thermal efficiency and the expansion ratio, while FIG. 8 shows a comparison of the ordinary cycle and superhigh expansion ratio cycle which are selectively used in accordance with the load in the present invention.

FIG. 8(A) shows an ordinary cycle in the case where an intake valve closes near bottom dead center and a compression action by a piston is started from near substantially suction bottom dead center. In the example which is shown in FIG. 8(A), in the same way as the example which is shown in FIGS. 6(A), (B), (C), the combustion chamber volume is made 50 ml and the stroke volume of the piston is made 500 ml. As will be understood from FIG. 8(A), in the ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio, the actual compression ratio, and the expansion ratio become substantially equal.

Figure 7:
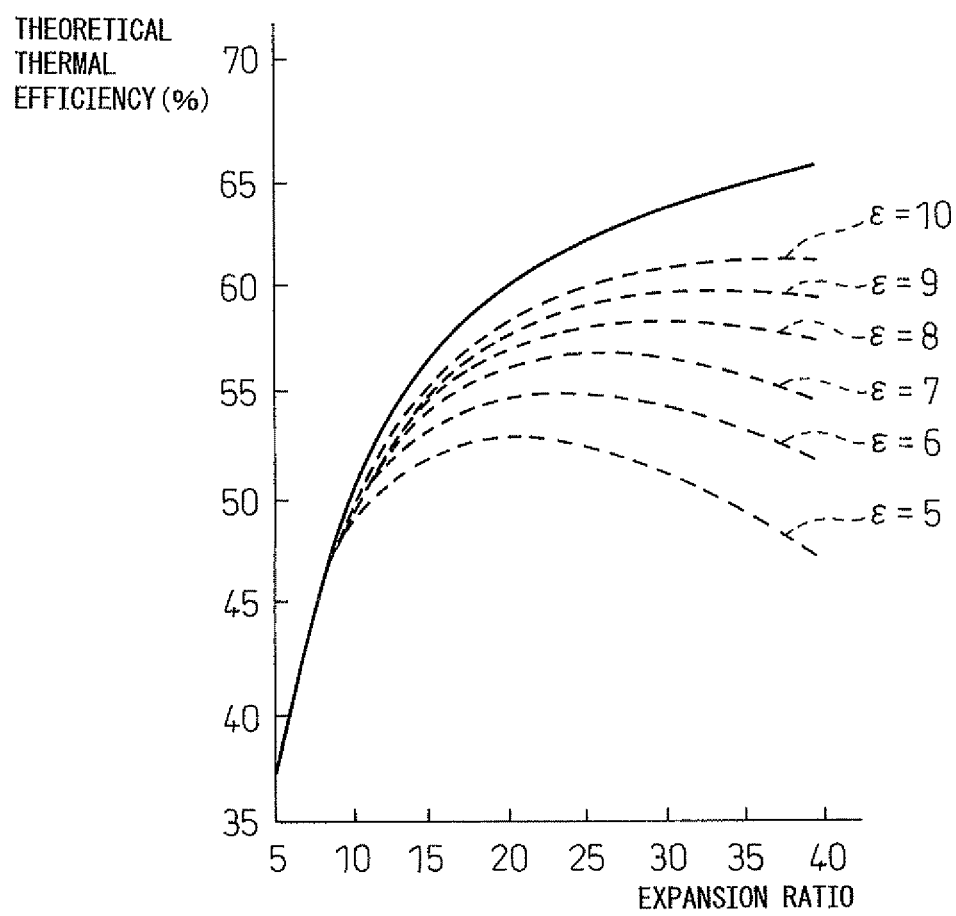
FIG. 7 is a view which shows a relationship between a theoretical thermal efficiency and the expansion ratio.
Figure 8:
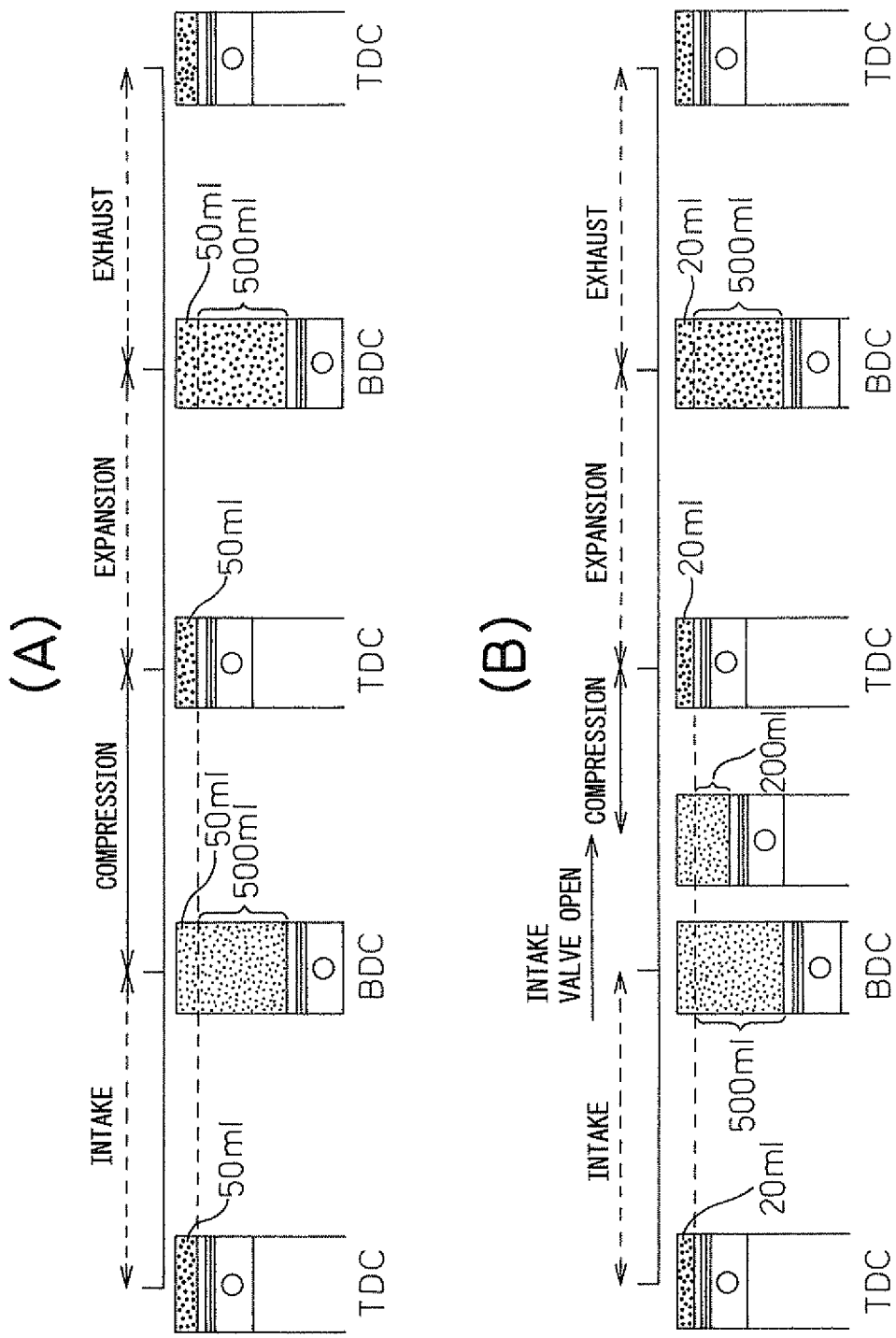
FIG. 8 is a view for explaining an ordinary cycle and a superhigh expansion ratio cycle.

The solid line in FIG. 7 shows the change in the theoretical thermal efficiency in the case where the actual compression ratio and expansion ratio are substantially equal, that is, the ordinary cycle. In this case, it is learned that the larger the expansion ratio, that is, the higher the actual compression ratio, the higher the theoretical thermal efficiency. Therefore, to raise the theoretical thermal efficiency in an ordinary cycle, it is sufficient to raise the actual compression ratio. However, due to the restrictions on the occurrence of knocking at the time of engine high load operation, the actual compression ratio can only be raised even at the maximum to about 12. Accordingly, in an ordinary cycle, the theoretical thermal efficiency cannot be made sufficiently high.

On the other hand, under this situation, to raise the theoretical thermal efficiency while strictly differentiating between the mechanical compression ratio and the actual compression ratio was studied and as a result it is discovered that in the theoretical thermal efficiency, the expansion ratio is dominant and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the time period during which a pushing force acts on a piston at the time of the expansion stroke becomes longer, therefore the time period during which the piston gives a rotational force to the crankshaft becomes longer. Therefore, the larger the expansion ratio, the higher the theoretical thermal efficiency. The broken line $\epsilon=10$ of FIG. 7 shows the theoretical thermal efficiency in the case of raising the expansion ratio in the state fixing the actual compression ratio at 10. In this way, it is learned that there is not a great difference between the amount of rise of the theoretical thermal efficiency when raising the expansion ratio in the state maintaining the actual compression ratio $\epsilon$ at a low value and the amount of rise of the theoretical thermal efficiency when the actual compression ratio is made to increase together with the expansion ratio as shown by the solid line in FIG. 7.

If the actual compression ratio is maintained at a low value in this way, knocking will not occur. Therefore, if raising the expansion ratio in the state maintaining the actual compression ratio at a low value, it is possible to block knocking while greatly raising the theoretical thermal efficiency. FIG. 8(B) shows an example of the case where the variable compression ratio mechanism A and the variable valve timing mechanism B are used to maintain the actual compression ratio at a low value while raising the expansion ratio.

Referring to FIG. 8(B), in this example, the variable compression ratio mechanism A is used to make the volume of a combustion chambers decrease from 50 ml to 20 ml. On the other hand, the variable valve timing mechanism B is used to make the closing timing of an intake valve retarded until the volume of the actual piston stroke changes from 500 ml to 200 ml. As a result, in this example, the actual compression ratio becomes (20 ml+200 ml)/20 ml=11, while the expansion ratio becomes (20 ml+500 ml)/20 ml=26. In the ordinary cycle which is shown in FIG. 8(A), as explained earlier, the actual compression ratio is about 11 and the expansion ratio is 11. Compared with this case, in the case which is shown in FIG. 8(B), it is learned that only the expansion ratio is raised to 26. This is the reason that it is called the "superhigh expansion ratio cycle".

Generally speaking, in an internal combustion engine, the lower the engine load, the worse the thermal efficiency. Therefore, to improve the thermal efficiency at the time of vehicle operation, that is, to improve the fuel efficiency, it becomes necessary to improve the thermal efficiency at the time when the engine load is low. On the other hand, in the superhigh expansion ratio cycle which is shown in FIG. 8(B), the actual piston stroke volume at the time of the compression stroke is made smaller, so the amount of intake air which can be sucked into a combustion chamber 5 becomes smaller, therefore this superhigh expansion ratio cycle can only be employed when the engine load is relatively low. Therefore, in the present invention, when the engine load is relatively low, the superhigh expansion ratio cycle which is shown in FIG. 8(B) is used, while at the time of engine high load operation, the ordinary cycle which is shown in FIG. 8(A) is used.

Next, the operational control as a whole will be explained while referring to FIG. 9.

Figure 9:
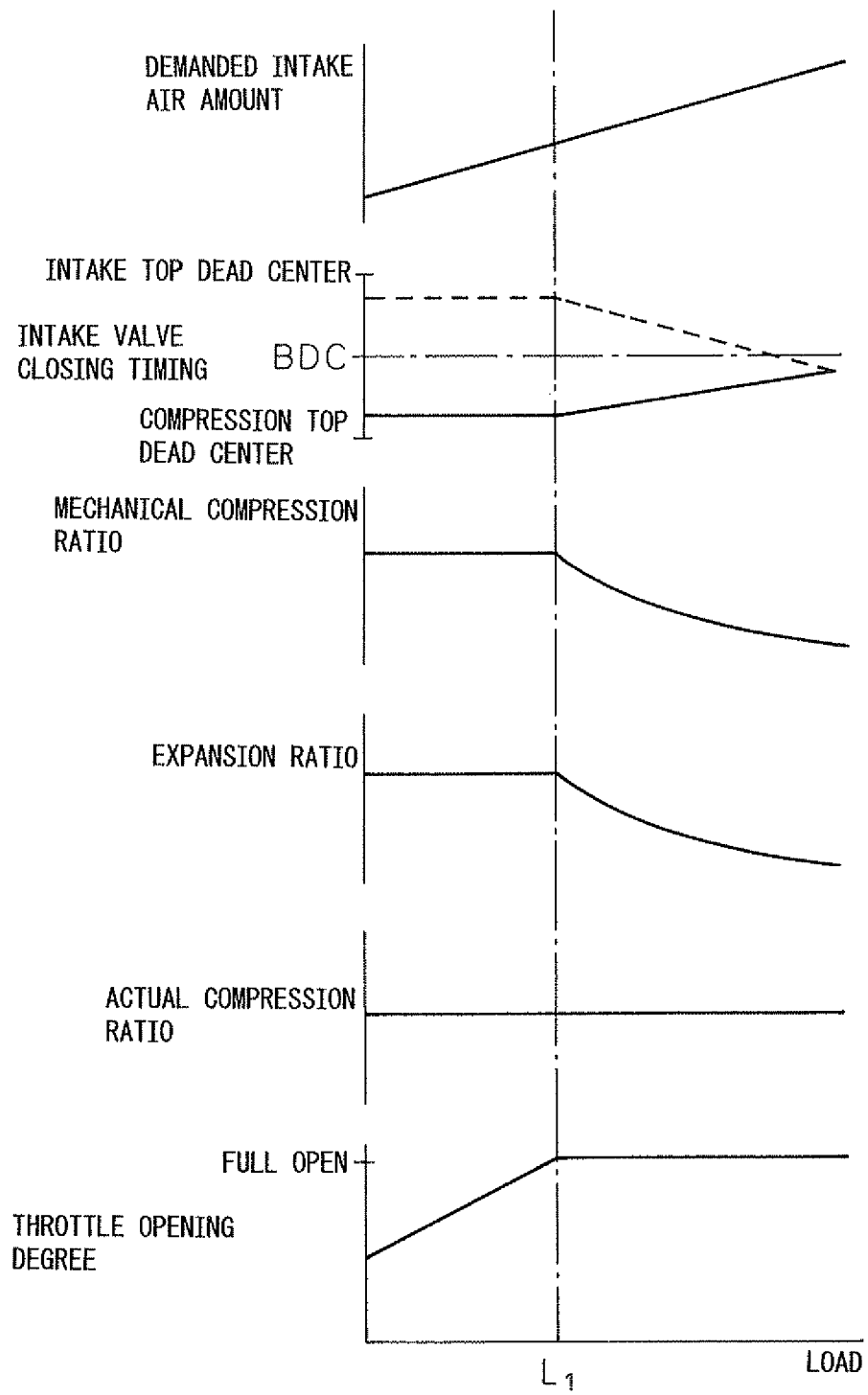
FIG. 9 is a view which shows changes in the mechanical compression ratio etc. in accordance with the engine load.

FIG. 9 shows the changes in the intake air amount, the closing timing of the intake valve, the mechanical compression ratio, the expansion ratio, the actual compression ratio, and the opening degree of the throttle valve 17 in accordance with the engine load at a certain engine speed. Note that, FIG. 9 shows the case where the average air-fuel ratio in the combustion chamber 5 is feedback controlled to the stoichiometric air-fuel ratio based on the output signal of the air-fuel ratio sensor 21 so that the three-way catalyst in the catalytic converter 20 can simultaneously reduce the unburned HC, CO, and $NO_x$ in the exhaust gas.

Now, as explained earlier, at the time of engine high load operation, the ordinary cycle which is shown in FIG. 8(A) is executed. Therefore, as shown in FIG. 9, at this time, the mechanical compression ratio is made low, so the expansion ratio is low. As shown by the solid line in FIG. 9, the closing timing of the intake valve 7 is made to advance as shown by the solid line in FIG. 5. Further, at this time, the amount of intake air is large. At this time, the opening degree of the throttle valve 17 is maintained full open, so the pumping loss becomes zero.

On the other hand, as shown in FIG. 9 by the solid line, if the engine load becomes low, along with this, the closing timing of the intake valve 7 is retarded to reduce the amount of intake air. Further, at this time, as shown in FIG. 9, as the engine load becomes lower, the mechanical compression ratio is increased so that the actual compression ratio is held substantially constant. Therefore, as the engine load becomes lower, the expansion ratio is also increased. Note that, at this time as well, the throttle valve 17 is held in the full open state. Therefore, the amount of intake air which is fed into the combustion chamber 5 is controlled by changing the closing timing of the intake valve 7 regardless of the throttle valve 17.

In this way, when the engine load becomes lower from the engine high load operating state, the mechanical compression ratio is made to increase along with the decrease in the amount of intake air under a substantially constant actual compression ratio. That is, the volume of the combustion chamber 5 when the piston 4 reaches compression top dead center is made to decrease proportionally to the decrease in the amount of intake air. Therefore, the volume of the combustion chamber 5 when the piston 4 reaches compression top dead center changes in proportion to the amount of intake air. Note that, at this time, in the example which is shown in FIG. 9, the air-fuel ratio in the combustion chamber 5 becomes the stoichiometric air-fuel ratio, so the volume of the combustion chamber 5 when the piston 4 reaches compression top dead center changes proportionally to the amount of fuel.

If the engine load becomes further lower, the mechanical compression ratio is made to further increase. If the engine load falls to the intermediate load $L_1$ somewhat near low load, the mechanical compression ratio reaches the limit mechanical compression ratio of the structural limit of the combustion chamber 5. If the mechanical compression ratio reaches the limit mechanical compression ratio, in the region of a load lower than the engine load $L_1$ when the mechanical compression ratio reaches the limit mechanical compression ratio, the mechanical compression ratio is held at the limit mechanical compression ratio. Therefore, at the time of low load side engine intermediate load operation and engine low load operation, that is, at the engine low load side, the mechanical compression ratio becomes maximum and the expansion ratio also becomes maximum. Putting this another way, at the engine low load operation side, the mechanical compression ratio is made maximum so that the maximum expansion ratio is obtained.

On the other hand, in the embodiment which is shown in FIG. 9, if the engine load falls to $L_1$, the closing timing of the intake valve 7 becomes the limit closing timing enabling control of the amount of intake air which is fed into the combustion chamber 5. If the closing timing of the intake valve 7 reaches the limit closing timing, in the region of a low lower than the engine load $L_1$ when the closing timing of the intake valve 7 reaches the limit closing timing, the closing timing of the intake valve 7 is held at the limit closing timing.

If the closing timing of the intake valve 7 is held at the limit closing timing, the amount of intake air will no longer be able to be controlled by the change of the closing timing of the intake valve 7. In the embodiment which is shown in FIG. 9, at this time, that is, in the region of a load lower than the engine load $L_1$ when the closing timing of the intake valve 7 reaches the limit closing timing, the throttle valve 17 is used to control the amount of intake air which is fed into the combustion chamber 5. The lower the engine load, the smaller the opening degree of the throttle valve 17 is made.

On the other hand, as shown in FIG. 9 by the broken line, as the engine load becomes lower, by advancing the closing timing of the intake valve 7 as well, it is possible to control the amount of intake air without depending on the throttle valve 17. Therefore, in FIG. 9, if comprehensively expressing both the case which is shown by the solid line and the case which is shown by the broken line, in the embodiment according to the present invention, the closing timing of the intake valve 7 is shifted as the engine load becomes lower in a direction away from intake bottom dead center BDC until the limit closing timing $L_1$ enabling control of the amount of intake air which is fed into the combustion chamber. In this way, the amount of intake air can be controlled by making the closing timing of the intake valve 7 change as shown in FIG. 9 by the solid line and can be controlled by making it change as shown by the broken line, but below the present invention will be explained with reference to the example of the case of making the closing timing of the intake valve 7 change as shown in FIG. 9 by the solid line.

In this regard, as explained earlier, in the superhigh expansion ratio cycle which is shown in FIG. 8(B), the expansion ratio is made 26. This expansion ratio is preferably high, but as will be understood from FIG. 7, if 20 or more, a considerably high theoretical thermal efficiency can be obtained even with respect to the actually usable lower limit actual compression ratio $\epsilon=5$. Therefore, in the present invention, the variable compression ratio mechanism A is formed so that the expansion ratio becomes 20 or more.

Next, referring to FIG. 10 to FIG. 12, a no-entry region and a reference operating line for the mechanical compression ratio and the closing timing of the intake valve will be explained.

Figure 10:
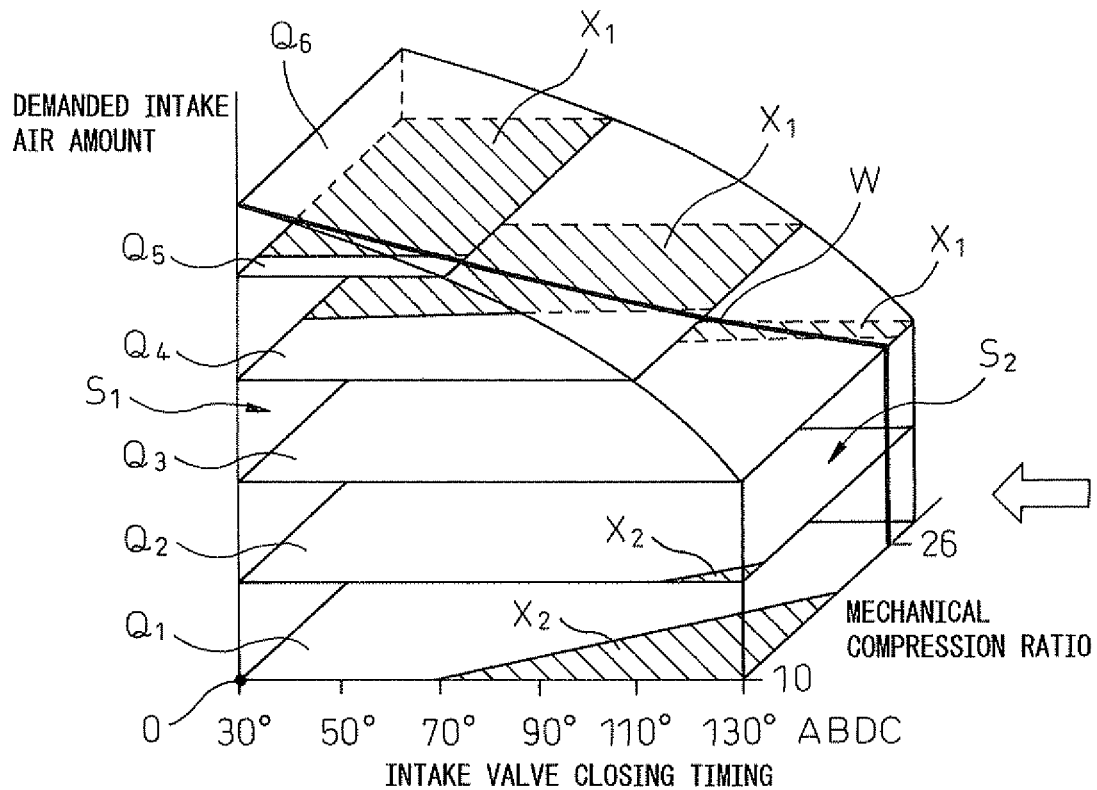
FIG. 10 is a view which shows no-entry regions and a target operating line.

FIG. 10 shows the amount of intake air which is required for obtaining the demanded engine load, that is, the demanded intake air amount, the mechanical compression ratio, and the closing timing of the intake valve. Note that, in FIG. 10, the demanded intake air amount increases the further from the origin O, while the mechanical compression ratio increases the further from the origin O. Further, in FIG. 10, the closing timing of the intake valve is expressed by the crank angle after intake bottom dead center (ABDC), therefore the closing timing of the intake valve is retarded the further from the origin O.

On the other hand, in FIG. 10, $Q_1$, $Q_2$, $Q_3$, $Q_4$, and $Q_5$ respectively express identical intake air amount planes. $Q_6$ expresses a throttle full open plane where the throttle valve 17 is full open. As will be understood from FIG. 10, this throttle full open plane $Q_6$ is comprised of an upwardly bulging curved plane. At the region below this throttle full open plane $Q_6$, the further down, the smaller the throttle opening degree.

In FIG. 10, the regions which are shown by the hatching show no-entry regions in the identical intake air amount planes $Q_1$, $Q_2$, $Q_3$, $Q_4$, and $Q_5$. On the other hand, FIG. 11 shows what is seen from the top of FIG. 10. FIG. 12(A) shows the left side plane $S_1$ in FIG. 10 as seen from the arrow direction, while FIG. 12(B) shows the right side plane $S_2$ in FIG. 10 as seen from the arrow direction. In these FIG. 11 and FIGS. 12(A) and (B) as well, the regions which are shown by the hatching show no-entry regions.

Figure 11:
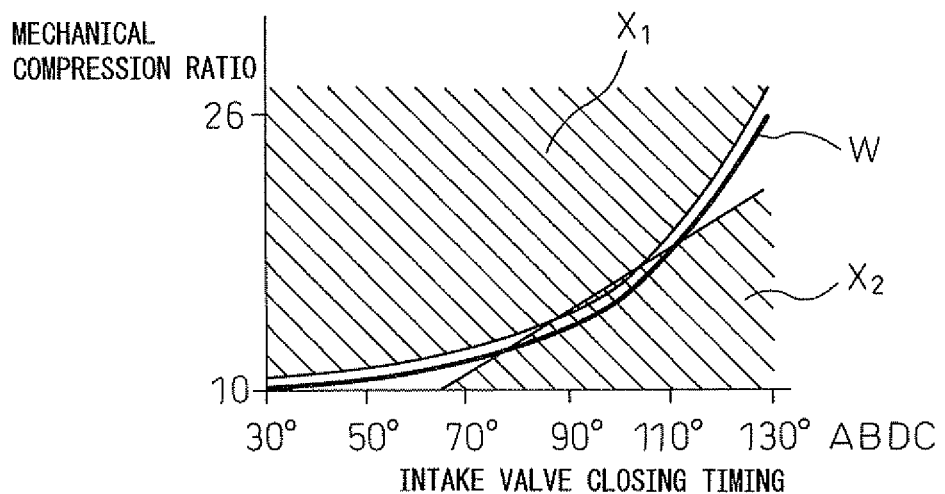
FIG. 11 is a view which shows no-entry regions and a target operating line.

From FIG. 10, FIG. 11, and FIGS. 12(A) and (B), it will be understood that the no-entry regions spread three-dimensionally and that further the no-entry regions are comprised of high load side regions $X_1$ and low load side regions $X_2$, that is, two types of regions. Note that, as will be understood from FIG. 10, FIG. 11, and FIGS. 12(A) and (B), the high load side no-entry regions $X_1$ are formed at the side where the demanded intake air amount is large, the closing timing of the intake valve is at the advanced side, and the mechanical compression ratio is high, while the low load side no-entry regions $X_2$ are formed at the side where the demanded intake air amount is small, the closing timing of the intake valve is at the retarded side, and the mechanical compression ratio is low.

Now then, FIG. 9 shows the relationship among the closing timing of the intake valve, the mechanical compression ratio, the actual compression ratio, and the throttle opening degree which gives the minimum fuel consumption for the demanded intake air amount. The line which satisfies the relationship of these is shown by the solid line W in FIG. 10 and FIG. 11. As will be understood from FIG. 10, this line W extends on the throttle full open plane $Q_6$ at the side of the greater amount of intake air than the identical intake air amount plane $Q_3$ and extends on the right side plane $S_2$ at the side of a smaller amount of intake air than the identical intake air amount plane $Q_3$. This identical intake air amount plane $Q_3$ corresponds to the load $L_1$ of FIG. 9.

That is, in FIG. 9, in the region where the engine load is higher than $L_1$, the higher the engine load, that is, the greater the demanded intake air amount, the more the closing timing of the intake valve is advanced in the state where the throttle valve 17 is held full open. At this time, the mechanical compression ratio is made to fall the more the demanded intake air amount is increased so that the actual compression ratio becomes constant. The relationship between the mechanical compression ratio and the closing timing of the intake valve at this time is expressed by the line W on the throttle full open plane $Q_6$ of FIG. 10. That is, as shown in FIG. 10, at the side greater than the intake air amount from the identical intake air amount plane $Q_3$, the more the demanded intake air amount increases, the more the closing timing of the intake valve is advanced in the state where the throttle valve 17 is held full open. At this time, the mechanical compression ratio is made to fall the more the demanded intake air amount is increased so that the actual compression ratio becomes constant.

On the other hand, in FIG. 9, in the region where the engine load is lower than $L_1$, the mechanical compression ratio and the closing timing of the intake valve are held constant. The lower the engine load, that is, the more the demanded intake air amount is decreased, the more the opening degree of the throttle valve 17 is made to decrease. The relationship between the mechanical compression ratio and the closing timing of the intake valve at this time is expressed by the line W on the right side plane $S_2$ of FIG. 10. That is, as shown in FIG. 10, at the side where the intake air amount is smaller than the identical intake air amount plane $Q_3$, the mechanical compression ratio and the closing timing of the intake valve are held constant. The lower the engine load, that is, the more the demanded intake air amount is decreased, the more the opening degree of the throttle valve 17 is made to decrease.

In the Description, the line followed by the mechanical compression ratio and the closing timing of the intake valve when the demanded intake air amount changes is called the "operating line". In particular, the line W which is shown by FIG. 10 is called the "reference operating line. Note that, as explained earlier, this reference operating line shows the minimum fuel consumption operating line giving the minimum fuel consumption.

As explained earlier, on this reference operating line W, the actual compression ratio is made constant. The actual compression ratio has nothing to do with the opening degree of the throttle valve 17 and is determined only by the mechanical compression ratio and the closing timing of the intake valve, so in FIG. 10 becomes an identical actual compression ratio on a curved plane which passes through the reference operating line W and extends in the vertical direction. In this case, the actual compression ratio becomes high at the high mechanical compression ratio side from this curved plane, while the actual compression ratio becomes low at the low mechanical compression ratio side from this curved plane. That is, roughly speaking, the high load side no-entry regions $X_1$ are positioned at regions of a higher actual compression ratio than the actual compression ratio on the reference operating line W, while the low load side no-entry regions $X_2$ are positioned at regions of a lower actual compression ratio than the actual compression ratio on the reference operating line W.

Now then, if raising the actual compression ratio to improve the fuel economy, knocking will occur. If retarding the ignition timing to prevent the occurrence of knocking, the combustion will become unstable and torque fluctuation will occur. The high load side no-entry regions $X_1$ are operating regions where such torque fluctuation occurs. Therefore, at the time of engine operation, it is necessary to ensure that the operating state of the engine will not enter such operating regions where torque fluctuation occurs. On the other hand, if the amount of intake air is small and the actual compression ratio becomes lower, combustion will become harder. As the opening degree of the throttle valve 17 becomes smaller and the compression end pressure becomes lower, the fuel economy deteriorates and torque fluctuation occurs. The low load side no-entry regions $X_2$ are operating regions in which such torque fluctuation occurs. Therefore, at the time of engine operation, it is necessary to ensure that the operating state of the engine will not enter such operating regions.

On the other hand, the higher the actual compression ratio becomes, the more the fuel economy is improved. Therefore, the minimum fuel consumption operating line where the minimum fuel consumption can be obtained without the occurrence of knocking or torque fluctuation, as shown by W in FIG. 10 and FIG. 11, extends at the outside of the high load side no-entry regions $X_1$ along the outer edges of the high load side no-entry regions $X_1$. As explained earlier, in the embodiment according to the present invention, this minimum fuel consumption operating line is made the reference operating line W. Basically, the mechanical compression ratio, the closing timing of the intake valve, and the opening degree of the throttle valve 17 are controlled in accordance with the demanded intake air amount so that the operating point showing the combination of the mechanical compression ratio and the closing timing of the intake valve moves on this reference operating line W. Note that, the current operating point is constantly detected by the relative position sensor 22, valve timing sensor 23, and throttle opening degree sensor 24.

Next, the method of control of the mechanical compression ratio, the closing timing of the intake valve, and the opening degree of the throttle valve 17 according to the present invention will be explained from the basic method of control. This basic method of control is shown from FIG. 13 to FIG. 15.

Figure 13:
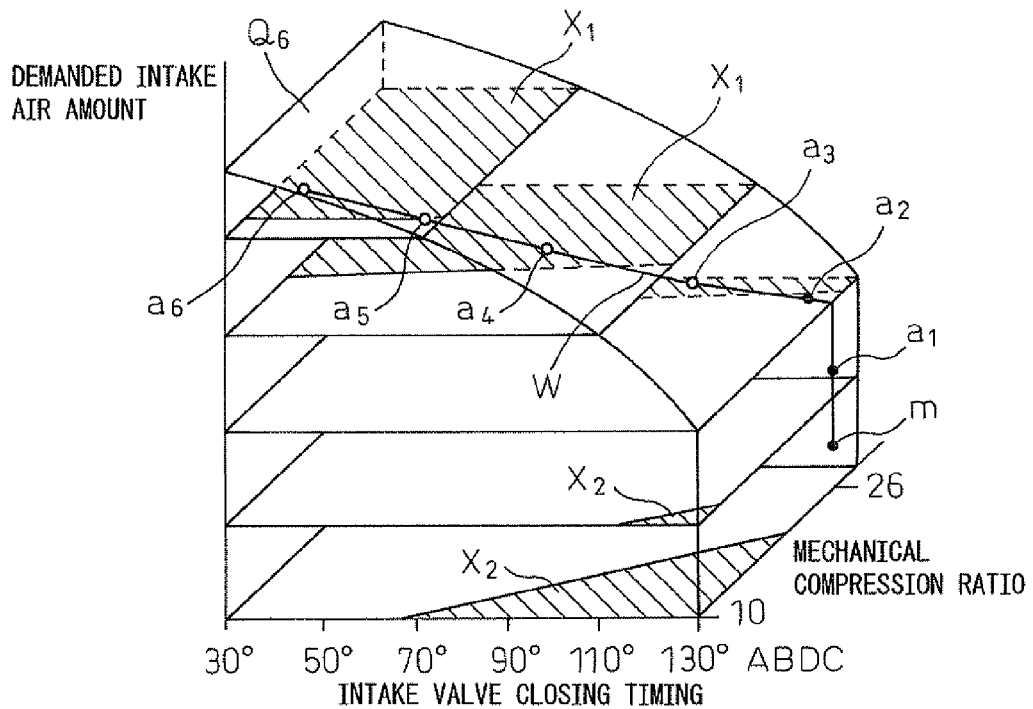
FIG. 13 is a view which shows a target operating point and an operating point.

That is, FIG. 13 shows the case where the demanded intake air amount is made to increase when the mechanical compression ratio and the closing timing of the intake valve are maintained at values at the point "m" on the reference operating line W. In this regard, in the embodiment according to the present invention, for example, the demanded intake air amount is calculated every predetermined time period. The operating point on the reference operating line W which satisfies the demanded intake air amount calculated every predetermined time period is successively calculated. One example of the operating points which satisfy the demanded intake air amount, that is, the demanded operating points, is shown in FIG. 13 by $a_1$, $a_2$, $a_3$, $a_4$, $a_5$, and $a_6$. That is, in this example, the demanded operating point which satisfies the demanded intake air amount which is first detected after the demanded intake air amount is made to increase is $a_1$, the demanded operating point which satisfies the demanded intake air amount which is next detected is $a_2$, and the demanded operating point which satisfies the demanded intake air amount which is next detected is $a_3$.

If the demanded operating point changes, the operating point which shows the mechanical compression ratio and the closing timing of the intake valve changes toward a new demanded operating point. That is, in the example which is shown in FIG. 13, the operating point which shows the mechanical compression ratio and the closing timing of the intake valve changes from the point "m" to the point "$a_1$" if the demanded operating point is made $a_1$, while the operating point which shows the mechanical compression ratio and the closing timing of the intake valve changes toward $a_2$ if the demanded operating point is made $a_2$. In this case, if the mechanical compression ratio and the closing timing of the intake valve reach the demanded operating point before the demanded operating point changes, the mechanical compression ratio and the closing timing of the intake valve will change following changes in the demanded operating point without any problem at all. However, if the mechanical compression ratio and the closing timing of the intake valve do not reach the demanded operating point before the demanded operating point changes, sometimes a problem will occur.

That is, in FIG. 13, when the mechanical compression ratio and the closing timing of the intake valve are at the point "m", when the demanded operating point is $a_1$, the mechanical compression ratio and the intake valve timing will not change. At this time, the opening degree of the throttle valve 17 is made to increase to satisfy the demanded intake air amount. The response to change of the opening degree of the throttle valve 17 by the actuator 16 is extremely fast, therefore when the demanded operating point becomes $a_1$, the operating point which shows the mechanical compression ratio and the closing timing of the intake valve immediately moves from the point "m" to the point "$a_1$".

Next, when the demanded operating point becomes $a_2$, the mechanical compression ratio is made to decrease just a little and the closing timing of the intake valve is advanced just a little while the throttle valve 17 is made full open. At this time, the mechanical compression ratio and the closing timing of the intake valve reach near the demanded operating point $a_2$ around when the next demanded operating point $a_3$ is calculated. The mechanical compression ratio and the closing timing of the intake valve which are reached at this time are shown by the operating point $b_2$ in FIG. 14 which shows them seen from above FIG. 13.

If the demanded operating point $a_3$ is calculated, the mechanical compression ratio and the closing timing of the intake valve start to move from the operating point $b_2$ toward the demanded operating point $a_3$. That is, in the state where the throttle valve 17 is full open, the mechanical compression ratio is made to fall and the closing timing of the intake valve is made to advance. However, the response of the change of the mechanical compression ratio by the variable compression ratio mechanism A and the response of the change of the closing timing of the intake valve 7 by the variable valve timing mechanism B are not that fast. In particular, the response of the change of the mechanical compression ratio by the variable compression ratio mechanism A is considerably slow. Therefore, if the speed of increase of the demanded intake air amount is fast, the demanded operating point and the operating point showing the actual values of the mechanical compression ratio and the closing timing of the intake valve gradually separate from each other. For example, in FIG. 14, when the demanded operating point moves to $a_6$, the state arises where the operating point which shows the actual values of the mechanical compression ratio and the closing timing of the intake valve continues to be positioned near $b_2$.

However, in such a case, if making the mechanical compression ratio and the closing timing of the intake valve move toward the demanded operating point without entering the no-entry region $X_1$ by feedback control, time is required until the mechanical compression ratio and the closing timing of the intake valve reach the demanded operating point. That is, in this case, by making the closing timing of the intake valve advance, when the operating point is about to enter the inside of a no-entry region $X_1$, the action of advancing the closing timing of the intake valve is stopped, then the mechanical compression ratio is made to decrease by exactly a certain amount. If the mechanical compression ratio is made to decrease by exactly a certain amount, the closing timing of the intake valve is again advanced. If the operating point is about to enter the no-entry region $X_1$, the action retarding the closing timing of the intake valve is stopped. Below, this is repeated.

That is, if making the mechanical compression ratio and the closing timing of the intake valve move toward the demanded operating point by feedback control, the operating point which shows the mechanical compression ratio and the closing timing of the intake valve moves in a zigzag state along the outer edges of the no-entry region $X_1$, therefore time is required for the mechanical compression ratio and the closing timing of the intake valve to reach the demanded operating point. As a result, a good response of the engine to changes in the demanded intake air amount cannot be obtained.

Therefore, in the present invention, when the demanded intake air amount changes, a target operating point which the mechanical compression ratio and the closing timing of the intake valve can reach after a certain time when moving from the current operating point toward the demanded operating point which satisfies the demanded intake air amount without entering the no-entry regions $X_1$ and $X_2$ is calculated and the mechanical compression ratio and the closing timing of the intake valve are made to change toward this target operating point.

Next, one embodiment which embodies the present invention will be explained with reference to FIG. 14 which shows the throttle full open plane $Q_6$. As explained earlier, FIG. 14 shows the case where when the demanded operating point becomes $a_3$, the operating point which shows the mechanical compression ratio and the closing timing of the intake valve is $b_2$. In this case, the arrow $R_2$ expresses the amount which the mechanical compression ratio can reach by a predetermined fixed time when moving toward the demanded operating point $a_3$, while the arrow $S_2$ expresses the amount which the closing timing of the intake valve can reach by a predetermined fixed time when moving toward the demanded operating point $a_3$. Further, in FIG. 14, $c_2$ indicates the target operating point which can be reached after a fixed time when moving from the current operating point $b_2$ toward the demanded operating point $a_3$ satisfying the demanded intake air amount without entering the no-entry region $X_1$.

Figure 14:
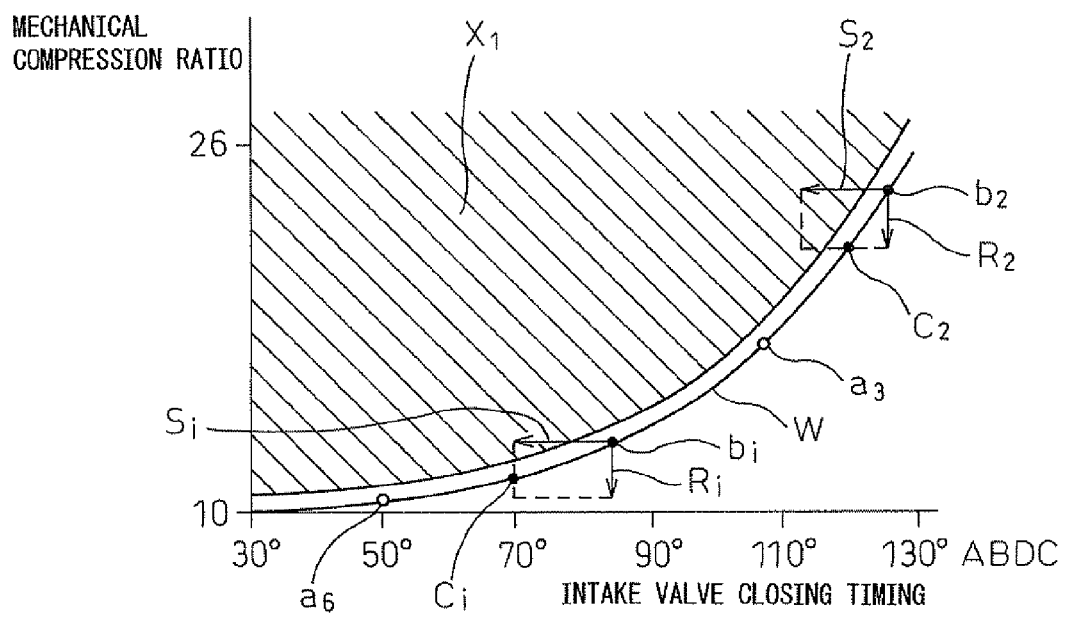
FIG. 14 is a view which shows a target operating point and an operating point.

As shown in FIG. 14, when the demanded intake air amount is made to increase and the operating point $b_2$ and the demanded operating point $a_3$ are on the throttle full open plane $Q_6$, this target operating point $c_2$ is positioned on the reference operating line W, in the example which is shown in FIG. 14, on the minimum fuel consumption operating line W. That is, in the example which is shown in FIG. 14, when the throttle valve 17 is maintained in the full open state, the target operating point is made to move outside of the no-entry regions $X_1$ on the minimum fuel consumption operating line W extending along the outer edges of the no-entry regions $X_1$.

Further, in FIG. 14, when the demanded operating point is $a_6$, if the operating point showing the mechanical compression ratio and the closing timing of the intake valve is $b_i$, in this case as well, the target operating point is made the point $c_i$ on the reference operating line W. Note that, in FIG. 14, the arrow $R_i$ similarly expresses the amount which the mechanical compression ratio can reach after a fixed time, while the arrow $S_i$ expresses the amount which the closing timing of the intake valve can reach after a fixed time.

In this way, in the example which is shown in FIG. 14, if the target operating point $c_2$ is calculated when the operating point is $b_2$, the operating point which shows the mechanical compression ratio and the closing timing of the intake valve will reach the target operating point $c_2$ after a fixed time. At this time, the next new target operating point which can be reached after a fixed time when moving from the current operating point $c_2$ toward the demanded operating point which satisfies the demanded intake air amount without entering the no-entry region $X_1$ is calculated. The operating point reaches this new target operating point after a fixed time. In this case, in the embodiment according to the present invention, the mechanical compression ratio, the closing timing of the intake valve, and the opening degree of the throttle valve 17 are made to reach the target operating point by PID (proportional integration and differentiation) control.

In this way, in the example which is shown in FIG. 14, the operating point which shows the mechanical compression ratio and the closing timing of the intake valve moves smoothly without stopping along the reference operating line W. That is, in FIG. 13, when the mechanical compression ratio and the closing timing of the intake valve are maintained at the point "m", if the demanded intake air amount is made to increase, the mechanical compression ratio and the closing timing of the intake valve can be made to change smoothly along the reference operating line W without stopping as shown by the arrow in FIG. 15. As a result, it becomes possible to secure a good response of the engine to changes in the demanded intake air amount.

In this case, to further improve the response of the engine to the demanded intake air amount, it is preferable to separate the target operating points $c_2$ and $c_i$ as much as possible from the corresponding current operating points $b_2$ and $b_i$. Therefore, in the embodiment according to the present invention, the target operating points $c_2$ and $c_i$ are made operating points the furthest from the current operating points $b_2$ and $b_i$ among the operating points which can be reached after a fixed time when moving from the corresponding the current operating points $b_2$ and $b_i$ toward the demanded operating point satisfying the demanded intake air amount without entering a no-entry region $X_1$.

That is, when the current operating point is $b_2$, the limit reached by the mechanical compression ratio from the operating point $b_2$ is made the target operating point $c_2$. Regarding the closing timing of the intake valve, this target operating point $c_2$ becomes before the reachable limit of the closing timing of the intake valve from the operating point $b_2$. Therefore, at this time, the mechanical compression ratio is made to drop by the possible maximum speed, while the closing timing of the intake valve is advanced by a speed slower than the possible maximum speed. As opposed to this, when the current operating point is $b_i$, the reachable limit of the closing timing of the intake valve from the operating point $b_i$ is made the target operating point $c_i$. Regarding the mechanical compression ratio, this target operating point $c_i$ becomes before the reachable limit of the closing timing of the intake valve from the operating point $b_i$. Therefore, at this time, the closing timing of the intake valve is advanced by the possible maximum speed, while the mechanical compression ratio is made to decrease by a speed slower than the possible maximum speed.

The maximum speed of change possible for the closing timing of the intake valve, that is, the value which can be reached after a fixed time, is not affected much at all by the operating state of the engine. Therefore, the value which the closing timing of the intake valve can reach after a fixed time becomes constant regardless of the operating state of the engine. As opposed to this, the maximum speed of change possible for the mechanical compression ratio, that is, the value which can be reached after a fixed time, is strongly affected by the operating state of the engine etc. Next, this will be explained while referring to FIG. 16 to FIG. 19.

Figure 16:
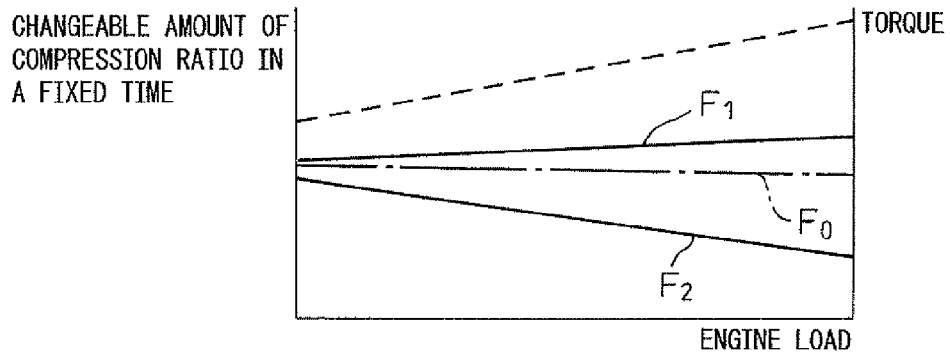
FIG. 16 is a view which shows a changeable amount of the mechanical compression ratio in a fixed time.

FIG. 16 shows the relationship between the changeable amount of the mechanical compression ratio at a fixed time, that is, the compression ratio difference between the current mechanical compression ratio and the mechanical compression ratio which can be reached after a fixed time, and the engine load. Note that, FIG. 16 shows the changeable amount of the compression ratio when the mechanical compression ratio is made a certain mechanical compression ratio. In FIG. 16, the dot and dash line $F_0$ shows the changeable amount of the compression ratio when the engine is stopped. Further, FIG. 16 shows the torque which is applied to the variable compression ratio mechanism A by the combustion pressure by the broken line. This torque acts in a direction pulling the cylinder block 2 away from the crankcase 1, that is, in a direction making the compression ratio fall. This torque, as shown by the broken line, is made larger the higher the combustion pressure becomes, that is, higher the engine load becomes.

In this way, this torque acts on the variable compression ratio mechanism A in a direction making the compression ratio fall, so when making the mechanical compression ratio fall, the mechanical compression ratio easily falls. Therefore, in this case, the changeable amount of the compression ratio becomes larger. In FIG. 16, the solid line $F_1$ shows the changeable amount of the compression ratio in this case. The changeable amount of the compression ratio in this case becomes larger the higher the engine load. As opposed to this, this torque counters the increase in the mechanical compression ratio, so when making the mechanical compression ratio increase, the changeable amount of the compression ratio becomes smaller compared with when making the mechanical compression ratio fall. In FIG. 16, the solid line $F_2$ shows the changeable amount of the compression ratio in the case of making the mechanical compression ratio increase. The changeable amount of the compression ratio in this case becomes smaller the higher the engine load.

In one embodiment according to the present invention, the changeable amount of the compression ratio which becomes the reference as shown by $F_0$ in FIG. 16 is stored in advance. This reference changeable amount of the compression ratio is corrected by the relationship shown by $F_1$ and $F_2$ in FIG. 16 to calculate the changeable amount of the compression ratio in accordance with the engine load. Next, the value of the mechanical compression ratio which can be reached after a fixed time is calculated from this calculated changeable amount of the compression ratio. That is, in this embodiment, the value of the mechanical compression ratio which can be reached after a fixed time is changed in accordance with the engine load when the demanded intake air amount is changed.

Figure 17:
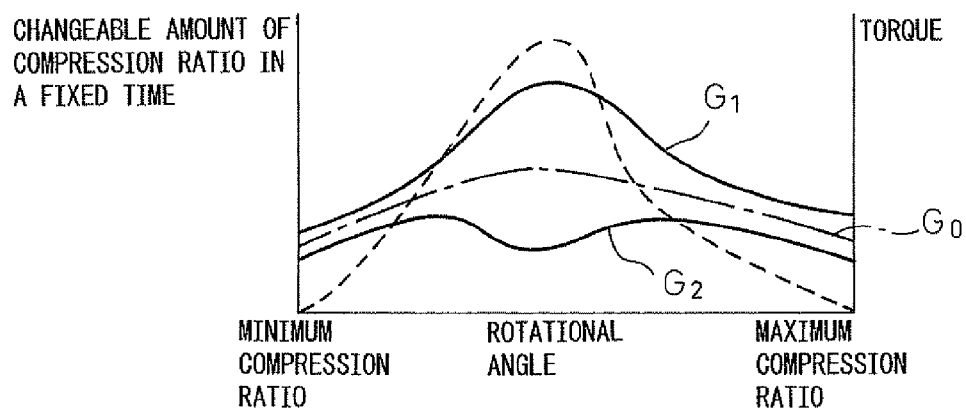
FIG. 17 is a view which shows a changeable amount of the mechanical compression ratio in a fixed time.

FIG. 17 shows the relationship between the changeable amount of the mechanical compression ratio and the rotational angles of the camshafts 54 and 55, that is, the rotational angles of the circular cams 58, at a fixed time. Note that, the left end of the abscissa in FIG. 17 shows the time of the lowest state of the mechanical compression ratio which is shown in FIG. 3(A), while the right end of the abscissa in FIG. 17 shows the time of the highest state of the mechanical compression ratio which is shown in FIG. 3(C). Further, FIG. 17 shows the changeable amount of the compression ratio when the engine load is made a certain load. In FIG. 17, the broken line shows the torque which is applied to the variable compression ratio mechanism A by the combustion pressure.

In the embodiment which is shown in FIG. 2, as the worm gears, a type where the worm gears 61 and 62 are not made to rotate by the gears 63 and 64, that is, a type where the worm gears 61 and 62 act to stop reverse rotation of the gears 63 and 64, is used. The dot and dash line $G_0$ of FIG. 17 shows the changeable amount of the compression ratio when engine operation is stopped where such worm gears are used. As will be understood from FIGS. 3(A), (B), and (C), when the mechanical compression ratio is intermediate, that is, at the time shown in FIG. 3(B), the change in the compression ratio per unit rotational angle of the camshafts 54, 55 becomes the maximum. Therefore, as shown by the dot and dash line $G_0$ in FIG. 17, when the mechanical compression ratio is intermediate, the changeable amount of the compression ratio becomes the maximum.

Further, as shown by the broken line in FIG. 17, the torque which is applied to the variable compression ratio mechanism A by the combustion pressure becomes the highest at the time which is shown in FIG. 3(B), that is, at the time when the mechanical compression ratio is intermediate. On the other hand, in FIG. 17, the solid line $G_1$ shows the case of making the mechanical compression ratio fall, while the solid line $G_2$ shows the case of making the mechanical compression ratio increase. As shown in FIG. 17, the changeable amount of the compression ratio $G_1$ when making the mechanical compression ratio fall becomes larger than the changeable amount of the compression ratio $G_2$ when making the mechanical compression ratio increase. Further, when the mechanical compression ratio is intermediate, the torque which is based on the combustion pressure becomes the highest, so, at this time, the changeable amount of the compression ratio $G_1$ becomes high and the changeable amount of the compression ratio $G_2$ falls.

In the embodiment according to the present invention, the changeable amount of the compression ratio which becomes the reference shown by $G_0$ in FIG. 17 is stored in advance. This reference changeable amount of the compression ratio is corrected by the relationship shown by $G_1$ and $G_2$ in FIG. 17 to calculate the changeable amount of the compression ratio in accordance with the rotational angles of the camshafts 54 and 55. Furthermore, this changeable amount of the compression ratio is corrected in FIG. 16 by the relationship shown by $F_1$ and $F_2$ to calculate the changeable amount of the compression ratio in accordance with the rotational angle of the camshafts 54 and 55 and the engine load. Next, the value of the mechanical compression ratio which can be reached after a fixed time is calculated from this calculated changeable amount of the compression ratio.

That is, in this embodiment, when the demanded intake air amount changes, the value of the mechanical compression ratio which can be reached after a fixed time is made to change in accordance with the rotational angle of the rotating cams 58 and the engine load.

Figure 18:
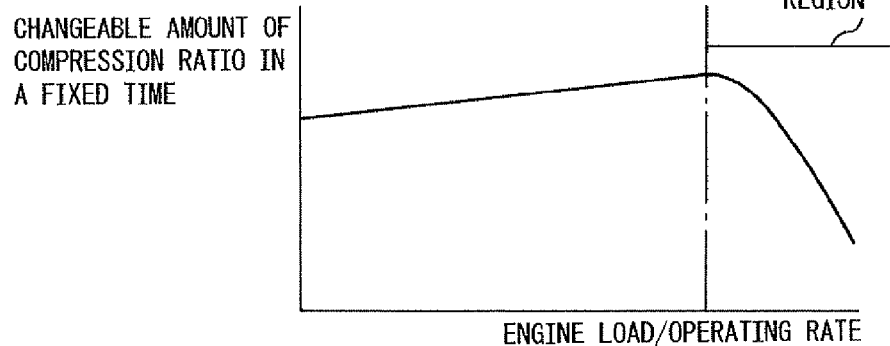
FIG. 18 is a view which shows a changeable amount of the mechanical compression ratio in a fixed time.

On the other hand, FIG. 18 shows the effect of a lubricated state of sliding bearings on the changeable amount of the compression ratio in the case where all of the bearings of the variable compression ratio mechanism A are comprised of sliding bearings. That is, the higher the engine load, the easier the lubricated state becomes a boundary lubrication region where the oil film starts to break. Further, the slower the operating speed at the bearing surfaces, the easier the lubricated state becomes the boundary lubrication region. Therefore, as shown in FIG. 18, if the (engine load/operating rate) exceeds a certain limit value, the lubricated state becomes the boundary lubrication region. As a result, the frictional force at the sliding bearings increases, so the changeable amount of the compression ratio becomes smaller.

In another embodiment of the present invention, the changeable amount of the compression ratio is calculated while considering also the lubricated state at the sliding bearings. For example, a reference changeable amount of the compression ratio which is shown by $F_0$ at FIG. 16 is corrected by the relationship shown by $F_1$ and $F_2$ in FIG. 16, the corrected changeable amount of the compression ratio is corrected by the relationship shown by $G_1$ and $G_2$ in FIG. 17, and the corrected changeable amount of the compression ratio is corrected by the relationship shown in FIG. 18 so as to calculate the changeable amount of the compression ratio in accordance with the engine load, the rotational angles of the camshafts 54, 55, and the (engine load/operating rate). Next, the value which the mechanical compression ratio can reach after a fixed time is calculated from the thus calculated changeable amount of the compression ratio.

Figure 19:
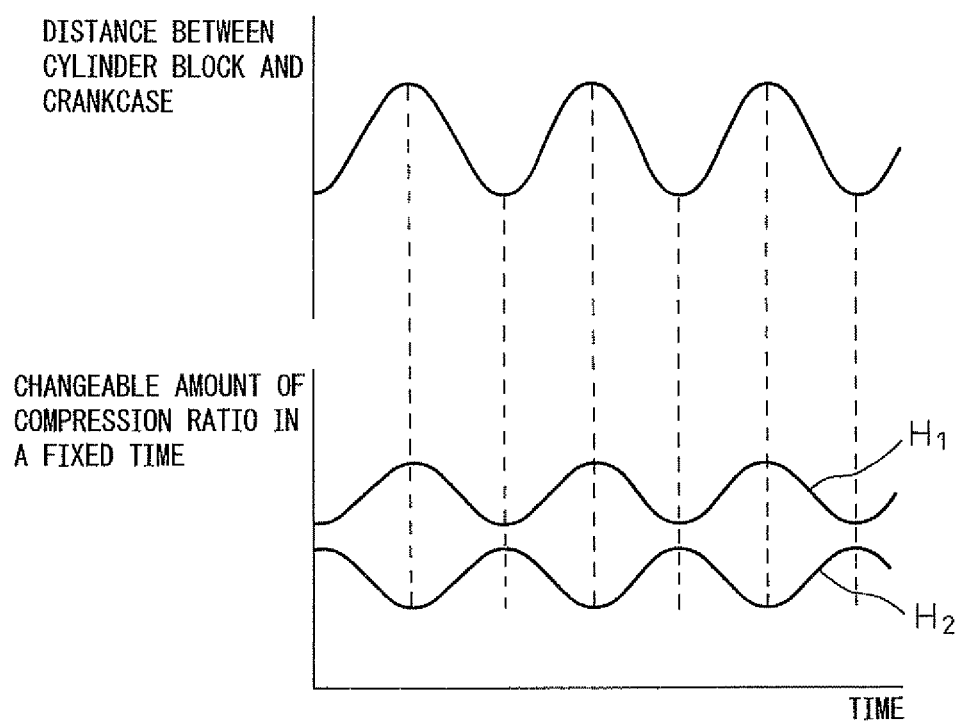
FIG. 19 is a view which shows a changeable amount of the mechanical compression ratio in a fixed time.

FIG. 19 shows an embodiment in which the fluctuations of the engine load is detected and the changeable amount of the compression ratio is calculated based on the detected fluctuations of the engine load. If the combustion pressure fluctuates between cycles or between cylinders, the eccentric shaft 57 bends and the relative position between the cylinder block 2 and the crankcase 1 changes. The change of the relative position of this cylinder block 2 and the crankcase 1, that is, the change of the distance between the cylinder block 2 and the crankcase 1, is detected by the relative position sensor 22. The distance between the cylinder block 2 and the crankcase 1 becomes larger the higher the combustion pressure.

As explained earlier, the variable compression ratio mechanism A is subjected to a torque due to the combustion pressure. This torque acts on the variable compression ratio mechanism A in a direction causing the compression ratio to fall. Therefore, if the combustion pressure rises, the variable compression ratio mechanism A enables the mechanical compression ratio to easily fall. $H_1$ in FIG. 19 shows the changeable amount of the compression ratio when making the mechanical compression ratio fall, while $H_2$ in FIG. 19 shows the amount of change of the compression ratio when making the mechanical compression ratio rise. The value which the mechanical compression ratio can reach after a fixed time is calculated from this changeable amount of the compression ratio.

In this embodiment, it is possible to suitably control the changeable amount of the compression ratio in accordance with fluctuations in the combustion pressure. In particular, if controlling the changeable amount of the compression ratio in accordance with the engine load as shown in FIG. 16 and further controlling the changeable amount of the compression ratio at this time based on the combustion pressure as shown in FIG. 19, it is possible to precisely control the changeable amount of the compression ratio to the optimum changeable amount of the compression ratio. Note that, if using, as gears, gears of a type which can turn worm gears 61 and 62 by gears 63 and 64, the bending of the eccentric shaft 57 when the combustion pressure fluctuates becomes further larger and, as a result, fluctuations of the torque which acts on the variable compression ratio mechanism A due to the combustion pressure can be more precisely detected by the relative position sensor 22.

Next, referring to FIG. 20 to FIG. 35, the case where the demanded intake air amount is made to decrease will be explained. Note that, among FIG. 20 to FIG. 35, FIG. 20 and FIG. 21 show the case where the demanded intake air amount is made to decrease slowly, FIG. 22 to FIG. 29 show the case where the demanded intake air amount is made to decrease relatively fast, and FIG. 30 to FIG. 35 show the case where the demanded intake air amount is made to decrease very fast. Note that, FIG. 20 to FIG. 35 show the case where the action of decreasing the demanded intake air amount is started when the operating point which shows the combination of the mechanical compression ratio and the closing timing of the intake valve is at the point "n" on the reference operating line W.

Figure 20:
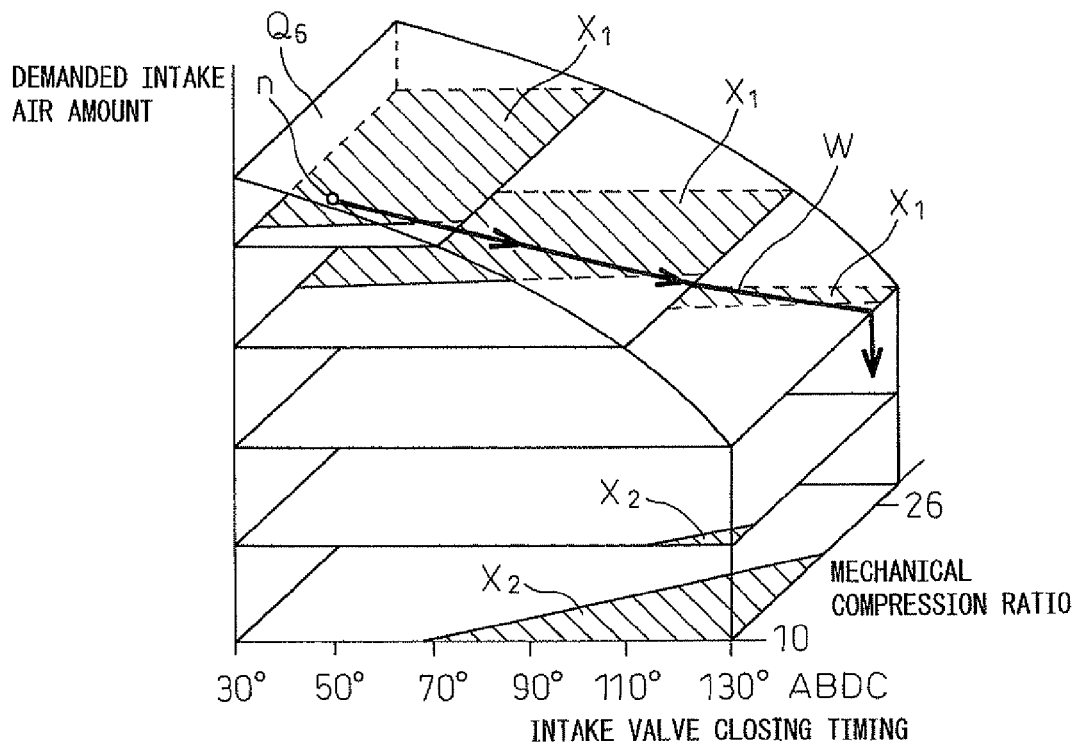
FIG. 20 is a view which shows changes in the mechanical compression ratio, the closing timing of the intake valve, and the throttle opening degree.

First, referring to FIG. 20 and FIG. 21, the case where the demanded intake air amount is made to decrease slowly will be explained. Note that, FIG. 21 shows the throttle full open plane $Q_6$ similar to FIG. 14.

Figure 21:
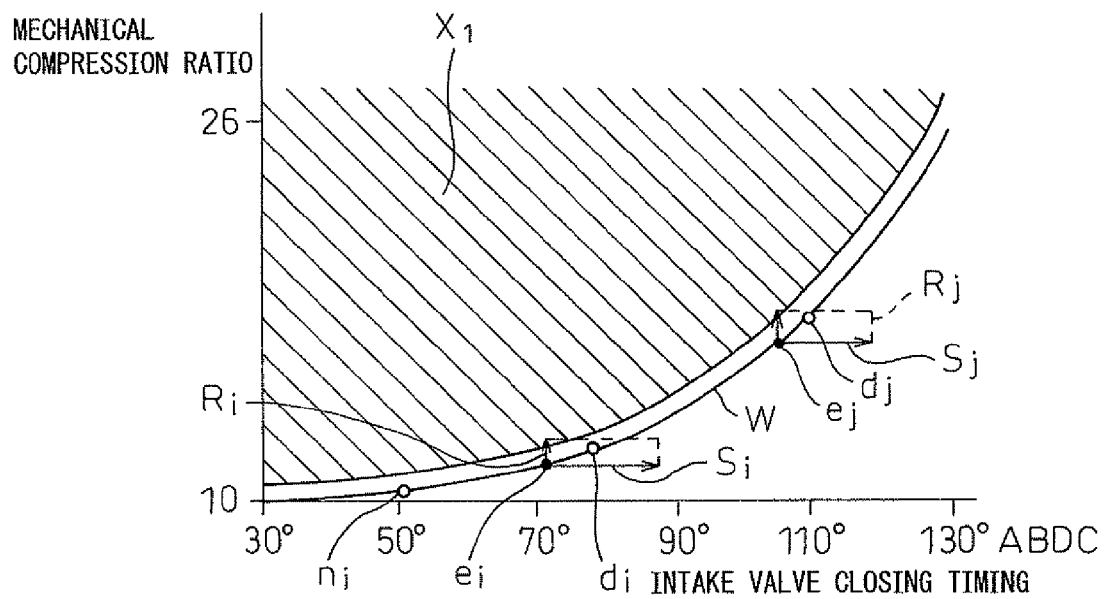
FIG. 21 is a view which shows a target operating point and an operating point.

FIG. 21 shows the relationship between the current operating point and the demanded operating point in this case. That is, FIG. 21 shows that the demanded operating point is $d_i$ when the current operating point is $e_i$. At this time, the amount which the mechanical compression ratio can reach after a fixed time is shown by $R_i$. At this time, the amount which the closing timing of the intake valve can reach after a fixed time is shown by $S_i$. Furthermore, FIG. 21 shows the demanded operating point when the current operating point is $e_j$ by $d_j$. At this time, the amount which the mechanical compression ratio can reach after a fixed time is shown by $R_j$. At this time, the amount which the closing timing of the intake valve can reach after a fixed time is shown by $S_j$.

In this case, the demanded operating point $d_i$ becomes before the reachable limit of the mechanical compression ratio and becomes before the reachable limit of the closing timing of the intake valve, so the demanded operating point $d_i$ becomes the target operating point. In the same way, the demanded operating point $d_j$ becomes before the reachable limit of the mechanical compression ratio and becomes before the reachable limit of the closing timing of the intake valve, so the demanded operating point $d_j$ becomes the target operating point. Therefore, in this case, the operating point moves along the reference operating line W. That is, when the demanded intake air amount slowly decreases, the throttle valve 17 is held full open and, in that state, the closing timing of the intake valve is gradually retarded and the mechanical compression ratio is gradually increased so that the actual compression ratio becomes constant.

Next, referring to FIG. 22 to FIG. 29, the case where the demanded intake air amount is made to decrease relatively fast will be explained. As explained earlier, in the embodiment according to the present invention, the demanded intake air amount is calculated, for example, every predetermined time period. The successively calculated demanded operating points on the reference operating line W which satisfy the demanded intake air amount are shown in FIG. 22 by $d_1$, $d_2$, $d_3$, $d_4$, and $d_5$.

Figure 22:
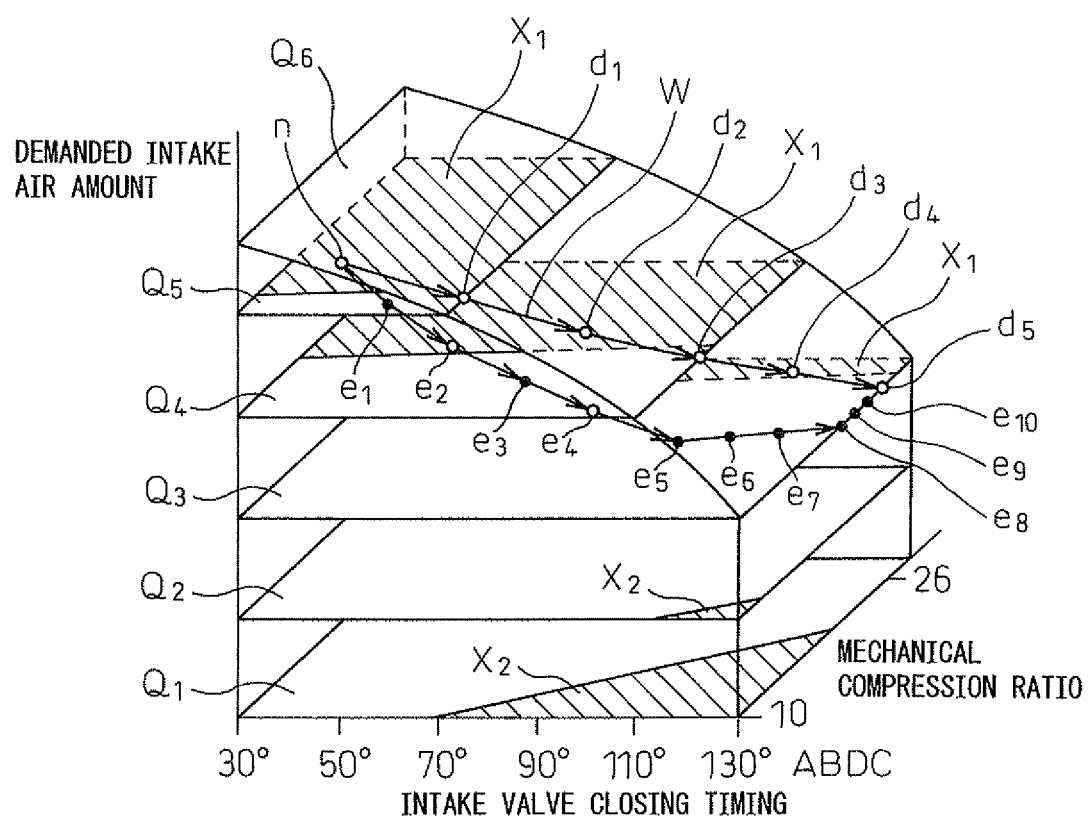
FIG. 22 is a view which shows a target operating point and an operating point.

Note that, to enable easy understanding of the control according to the present invention, FIG. 22 shows the case where the demanded intake air amount at the demanded operating point $d_1$ is $Q_5$, the demanded intake air amount at the demanded operating point $d_2$ is a value between $Q_5$ and $Q_4$, the demanded intake air amount at the demanded operating point $d_3$ is $Q_4$, the demanded intake air amount at the demanded operating point $d_4$ is between $Q_4$ and $Q_3$, and the demanded intake air amount at the demanded operating point $d_5$ is $Q_3$. That is, this shows the case where the demanded intake air amount which is successively calculated changes from $Q_6$ (point "n") to $Q_5$, a value between $Q_5$ and $Q_4$, $Q_4$, a value between $Q_4$ and $Q_3$, and $Q_3$.

Figure 23:
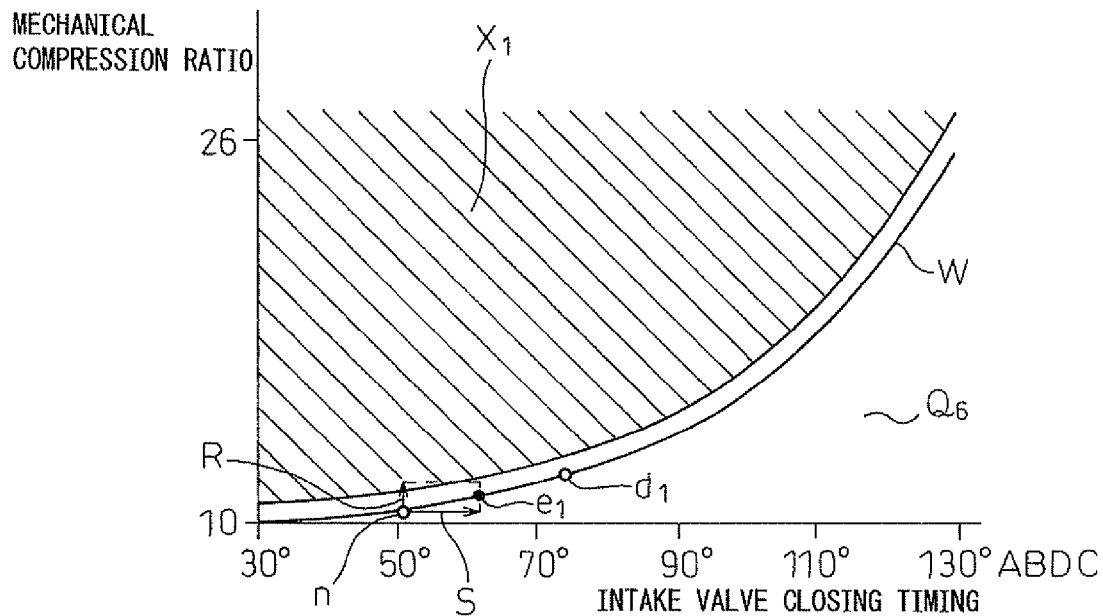
FIG. 23 is a view which shows a target operating point and an operating point.
Figure 24:
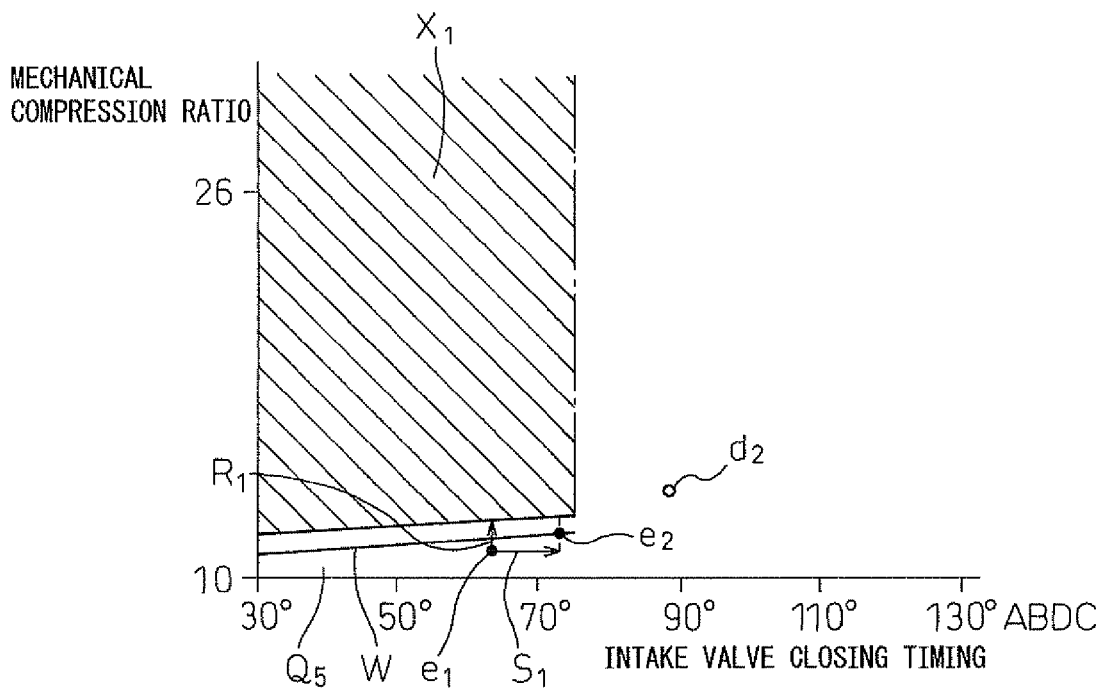
FIG. 24 is a view which shows a target operating point and an operating point.
Figure 25:
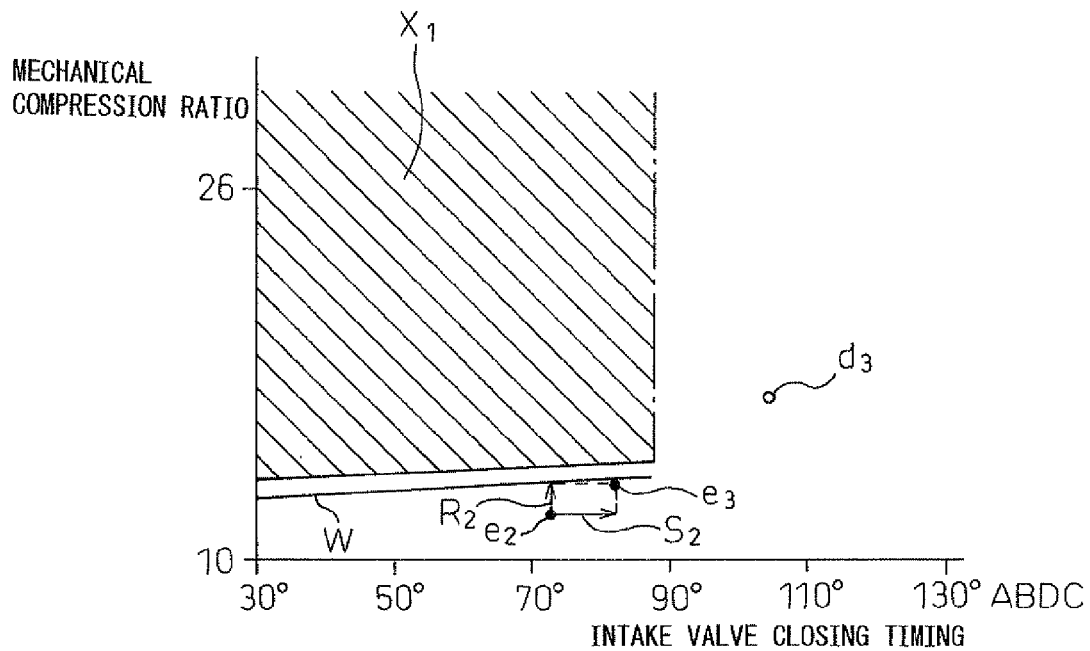
FIG. 25 is a view which shows a target operating point and an operating point.
Figure 26:
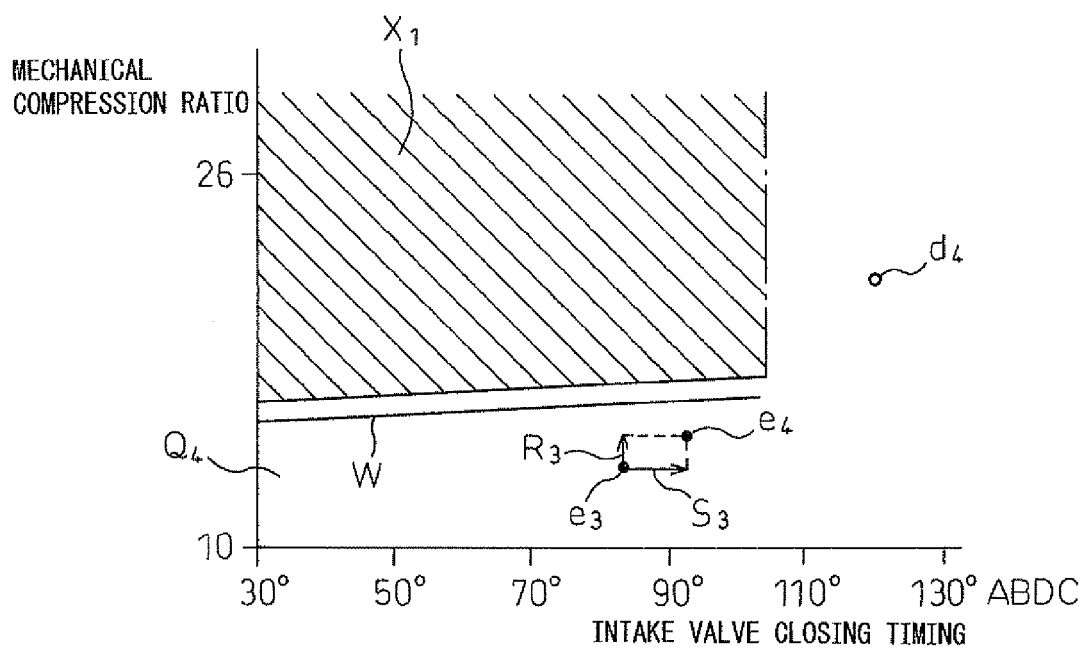
FIG. 26 is a view which shows a target operating point and an operating point.
Figure 27:
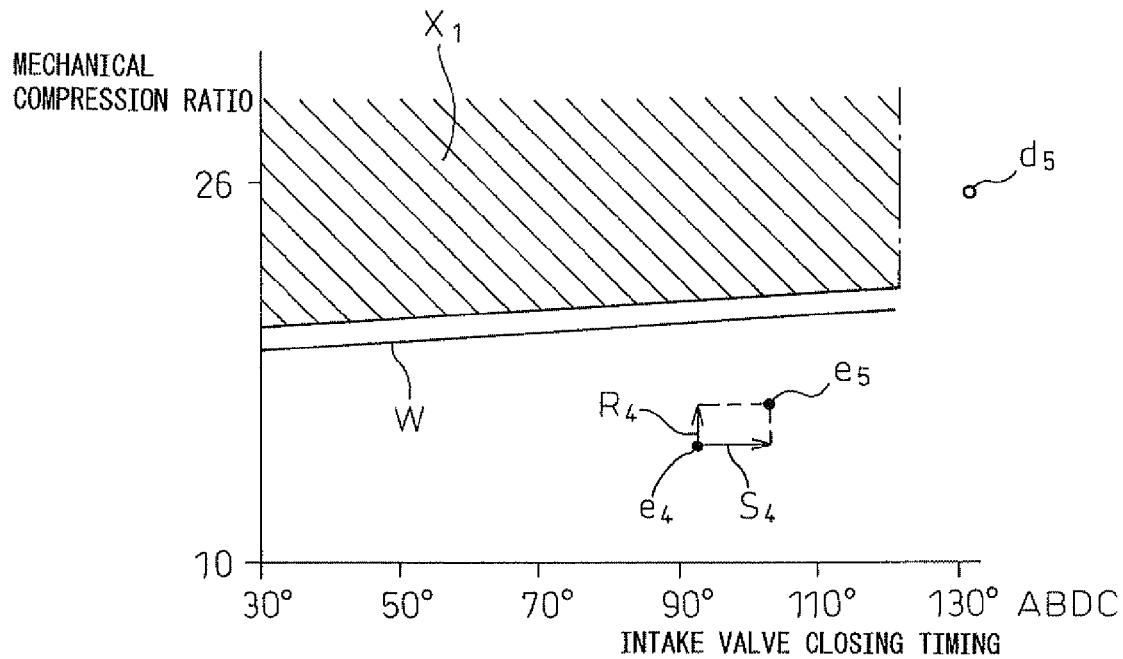
FIG. 27 is a view which shows a target operating point and an operating point.
Figure 28:
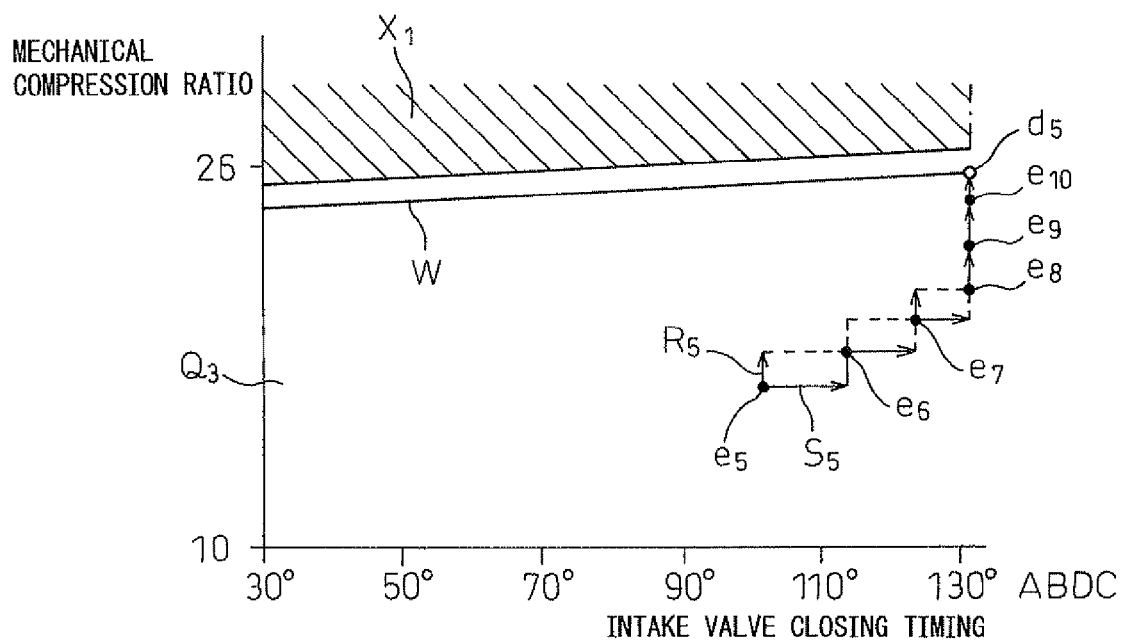
FIG. 28 is a view which shows a target operating point and an operating point.

Further, FIG. 23 shows the throttle full open plane $Q_6$, FIG. 24 shows the identical intake air amount plane where the intake air amount is $Q_5$, FIG. 25 shows the identical intake air amount plane where the intake air amount is a value between $Q_5$ and $Q_4$, FIG. 26 shows the identical intake air amount plane where the intake air amount is $Q_4$, FIG. 27 shows the identical intake air amount plane where the intake air amount is a value between $Q_4$ and $Q_3$, and FIG. 28 shows the identical intake air amount plane where the intake air amount is $Q_3$.

Now then, when the mechanical compression ratio and the closing timing of the intake valve are held at the operating point "n" shown in FIG. 22, the demanded intake air amount changes from $Q_6$ to $Q_5$. As a result, when the demanded operating point becomes $d_1$, first, as shown in FIG. 23, the target operating point $e_1$ on the throttle wide open plane $Q_6$ is calculated. The method of calculation of this target operating point $e_1$ is the same as the method of calculation which was explained up to here. The target operating point $e_1$ which is closest to the demanded operating point $d_1$ without entering the no-entry region $X_1$ is calculated from the amount which the mechanical compression ratio can reach after a fixed time and the amount which the closing timing of the intake valve can reach after a fixed time. In the example which is shown in FIG. 23, this target operating point $e_1$ is positioned on the reference operating line W.

Now, the intake air amount at this target operating point $e_1$ is a value between $Q_6$ and $Q_5$ and becomes a state larger than the demanded intake air amount $Q_5$. However, the intake air amount is preferably made to match the demanded intake air amount as much as possible. In this regard, when making the demanded intake air amount decrease, it is possible to adjust the amount of intake air by changing the opening degree of the throttle valve 17. Therefore, when in a state where the amount of intake air at the target operating point $e_1$ is larger than the demanded intake air amount $Q_5$, the target values of the mechanical compression ratio and the closing timing of the intake valve are not made to change, but the throttle valve 17 is made to close to the target opening degree which is required for making the amount of intake air the demanded intake air amount $Q_5$.

That is, in FIG. 22, the point on the identical intake air amount plane $Q_5$ which is positioned directly under the target operating point $e_1$ on the throttle full open plane $Q_6$ which is shown in FIG. 23 is made the final target operating point $e_1$. The final target operating point $e_1$ on the identical intake air amount plane $Q_5$ is shown in FIG. 22 and FIG. 24. The mechanical compression ratio, the closing timing of the intake valve, and the opening degree of the throttle valve 17 are made to change toward the final target operating point $e_1$. That is, at this time, the mechanical compression ratio is made to increase, the closing timing of the intake valve is retarded, and the opening degree of the throttle valve 17 is made smaller than the full open state.

Next, if the demanded intake air amount becomes a value between $Q_5$ and $Q_4$ and the demanded operating point becomes $d_2$, this time, as shown in FIG. 24, the target operating point $e_2$ at the identical intake air amount plane at the current intake air amount $Q_5$ is calculated. The method of calculation of this target operating point $e_2$ is also the same as the method of calculation explained up to here. The target operating point $e_2$ which is the closest to the demanded operating point $d_2$ without entering the no-entry region $X_1$ is calculated from the amount of the mechanical compression ratio which can be reached after a fixed time and the amount of the closing timing of the intake valve which can be reached after a fixed time. In the example which is shown in FIG. 24, this target operating point $e_2$ is positioned on the reference operating line W in the identical intake air amount plane $Q_5$.

In this regard, in this case as well, the amount of intake air at the target operating point $e_2$ is in a state larger than the demanded intake air amount. Therefore, in this case as well, in FIG. 22, the point on the identical intake air amount plane (value between $Q_5$ and $Q_4$) which is positioned directly under the target operating point $e_2$ on the identical intake air amount plane $Q_5$ which is shown in FIG. 24 is made the final target operating point $e_2$. The final target operating point $e_2$ on this identical intake air amount plane (value between $Q_5$ and $Q_4$) is shown in FIG. 22 and FIG. 25. The mechanical compression ratio, the closing timing of the intake valve, and the opening degree of the throttle valve 17 are made to change toward the final target operating point $e_2$. At this time as well, the mechanical compression ratio is made to increase, the closing timing of the intake valve is retarded, and the opening degree of the throttle valve 17 is made smaller from the full open state.

Next, when the demanded intake air amount becomes $Q_4$, next becomes a value between $Q_4$ and $Q_3$, then becomes $Q_3$, a similar operation is successively repeated. That is, when the demanded intake air amount becomes $Q_4$, as shown in FIG. 26, the final target operating point $e_3$ on the identical intake air amount plane $Q_4$ is calculated, when the demanded intake air amount becomes a value between $Q_4$ and $Q_3$, as shown in FIG. 27, the final target operating point $e_4$ on the identical intake air amount plane (value between $Q_4$ and $Q_3$) is calculated, then, when the demanded intake air amount becomes $Q_3$, as shown in FIG. 28, the final target operating point $e_5$ on the identical intake air amount plane $Q_3$ is calculated.

During this time, that is, while the mechanical compression ratio, the closing timing of the intake valve, and the opening degree of the throttle valve 17 are successively made to change toward the final target operating points $e_3$, $e_4$, and $e_5$, the mechanical compression ratio is made to increase, the closing timing of the intake valve is retarded, and the opening degree of the throttle valve 17 is made smaller.

If the demanded intake air amount becomes $Q_3$, as shown in FIG. 28, the final target operating points $e_6$, $e_7$, $e_8$, $e_9$, and $e_{10}$ are successively calculated on the identical intake air amount plane $Q_3$, and the mechanical compression ratio, the closing timing of the intake valve, and the opening degree of the throttle valve 17 are made to change through the successive final target operating points $e_6$, $e_7$, $e_8$, $e_9$, and $e_{10}$ to the demanded operating point $d_5$. During this period, the mechanical compression ratio is made to increase, the closing timing of the intake valve is retarded until reaching $e_8$, and the opening degree of the throttle valve 17 is gradually increased and is made to fully open when reaching $e_8$.

Figure 29:
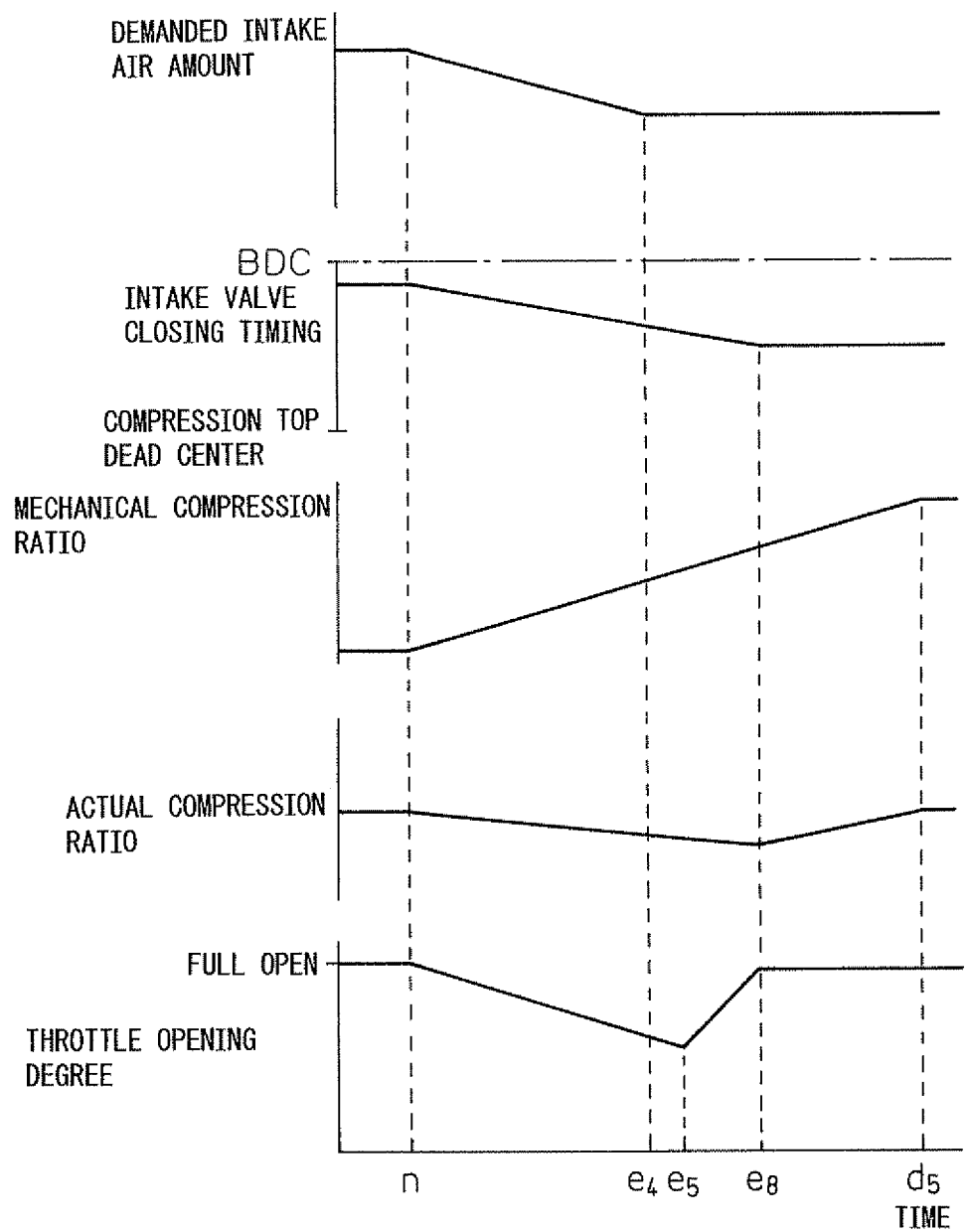
FIG. 29 is a view which shows changes in the mechanical compression ratio, the closing timing of the intake valve, and the throttle opening degree, etc.

FIG. 29 shows the changes in the closing timing of the intake valve, the mechanical compression ratio, the actual compression ratio, and the throttle opening degree when, as shown in FIG. 22, the target intake air amount is made to decrease relatively fast from $Q_6$ (point "n") to $Q_3$ (target operating point $d_5$). From FIG. 29, it will be understood that in this case, after the demanded intake air amount becomes the target value (operating point $e_4$), the action of retarding the closing timing of the intake valve is ended (operating point $e_8$), then the action to increase the mechanical compression ratio is ended (target operating point $d_5$). On the other hand, the actual compression ratio gradually decreases until the action of retarding the closing timing of the intake valve is ended (operating point $d_8$), then gradually rises. Further, the throttle opening degree is made to gradually drop from the full open state until the operating point becomes the operating point $e_5$ on the identical intake air amount plane $Q_3$, then is made to gradually open to the full open state until the action of retarding the closing timing of the intake valve ends (operating point $e_8$).

As shown from FIG. 22 to FIG. 29, when the demanded intake air amount is made to decrease relatively fast, the throttle opening degree is controlled in addition to the control of the mechanical compression ratio and the closing timing of the intake valve. In the present invention, at this time, three-dimensional no-entry regions $X_1$ and $X_2$ are set for the combination of the mechanical compression ratio, the closing timing of the intake valve, and the throttle opening degree. The operating point showing the combination of the mechanical compression ratio, the closing timing of the intake valve, and the throttle opening degree is prohibited from entering the three-dimensional no-entry regions $X_1$ and $X_2$.

Note that, in this case as well, when the demanded intake air amount has changed, the target operating point which the mechanical compression ratio and the closing timing of the intake valve can reach after a fixed time when moving from the current operating point toward the operating point which satisfies the demanded intake air amount without entering the three-dimensional no-entry regions $X_1$ and $X_2$ is calculated, and the mechanical compression ratio and the closing timing of the intake valve are made to change toward the calculated target operating point. Furthermore, in this case, when the demanded intake air amount changes, the throttle opening degree is made to change in accordance with the demanded intake air amount so that the throttle opening degree does not enter the three-dimensional no-entry regions $X_1$ and $X_2$.

Note that, in this case as well, to enable the mechanical compression ratio, the closing timing of the intake valve, and the throttle opening degree to reach the demanded operating point which satisfies the demanded intake air amount as fast as possible, the target operating point is made the operating point the furthest from the current operating point among the operating points which they can reach after a fixed time when moving from the current operating point toward the operating point which satisfies the demanded intake air amount without entering the three-dimensional no-entry regions $X_1$ and $X_2$.

Further, in this case, in the embodiment according to the present invention, when the demanded intake air amount is decreased, the target operating point which the mechanical compression ratio and the closing timing of the intake valve can reach after a fixed time when moving from the current operating point toward the operating point which satisfies the demanded intake air amount without entering the no-entry regions $X_1$ and $X_2$ at the current intake air amount is calculated, and the mechanical compression ratio and the closing timing of the intake valve are made to change toward the target operating point. On the other hand, in this case, for the throttle opening degree, the target opening degree which satisfies the demanded intake air amount at the calculated target operating point is calculated, and the throttle opening degree is made to change to the target opening degree so long as not at the three-dimensional no-entry regions $X_1$ and $X_2$.

Next, referring to FIG. 30 to FIG. 35, the case where the demanded intake air amount is made to decrease abruptly to the minimum intake air amount $Q_1$ will be explained. As explained earlier, in the embodiment according to the present invention, the demanded intake air amount is calculated, for example, every predetermined time period. The successively calculated demanded operating points on the reference operating line W which satisfy the demanded intake air amount are shown in FIG. 30 by $d_1$, $d_2$, and $d_3$.

Figure 30:
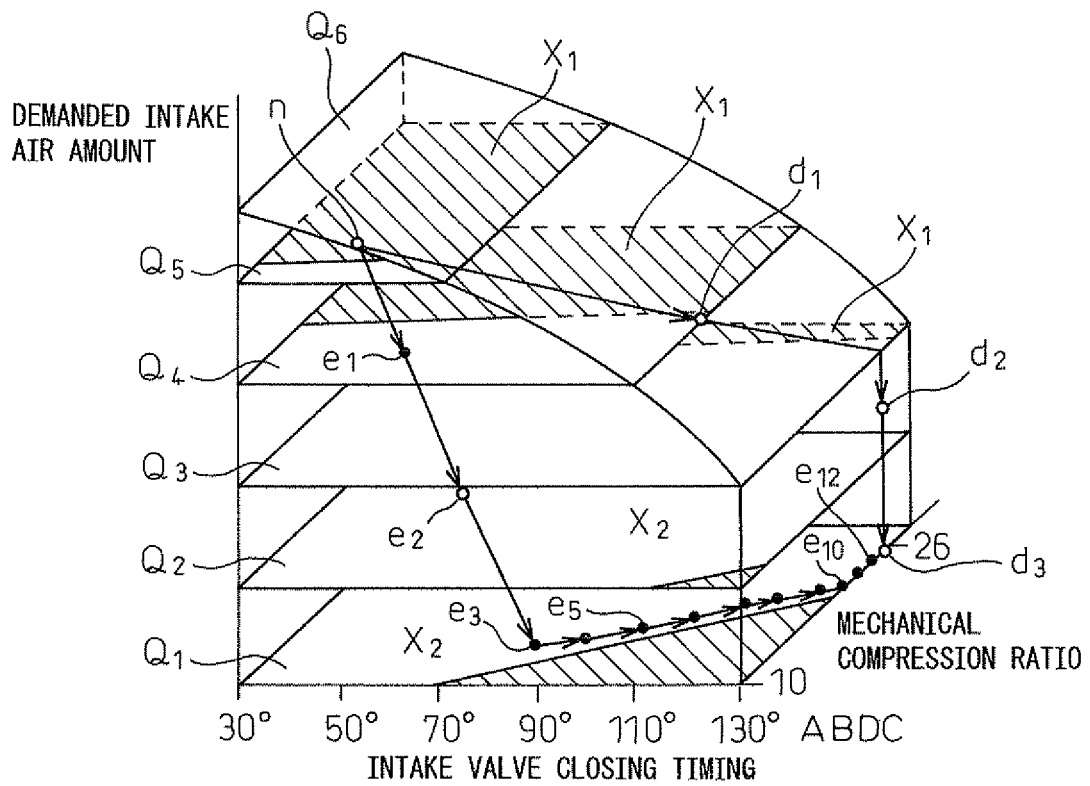
FIG. 30 is a view which shows a target operating point and an operating point.

Note that, to enable easy understanding of the control according to the present invention, FIG. 30 shows the case where the demanded intake air amount at the demanded operating point $d_1$ is $Q_4$, the demanded intake air amount at the demanded operating point $d_2$ is a value between $Q_2$ and $Q_3$, and the demanded intake air amount at the demanded operating point $d_3$ is $Q_1$. That is, this shows the case where the demanded intake air amount which is successively calculated changes from $Q_6$ (point "n") to $Q_5$, a value between $Q_3$ and $Q_2$, and $Q_1$.

Figure 31:
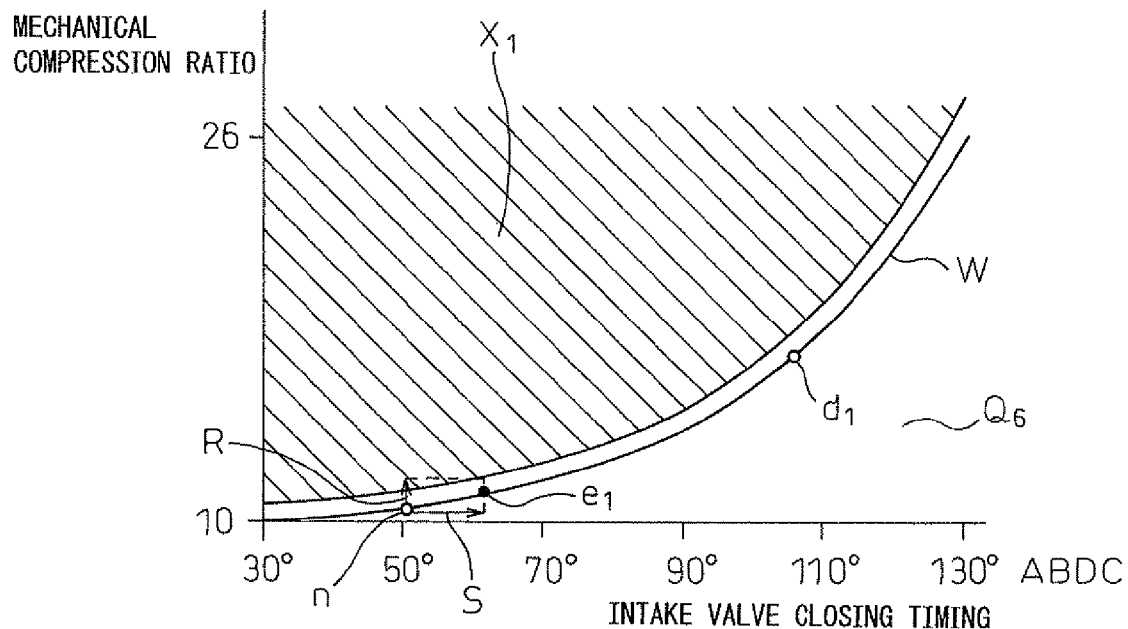
FIG. 31 is a view which shows a target operating point and an operating point.
Figure 32:
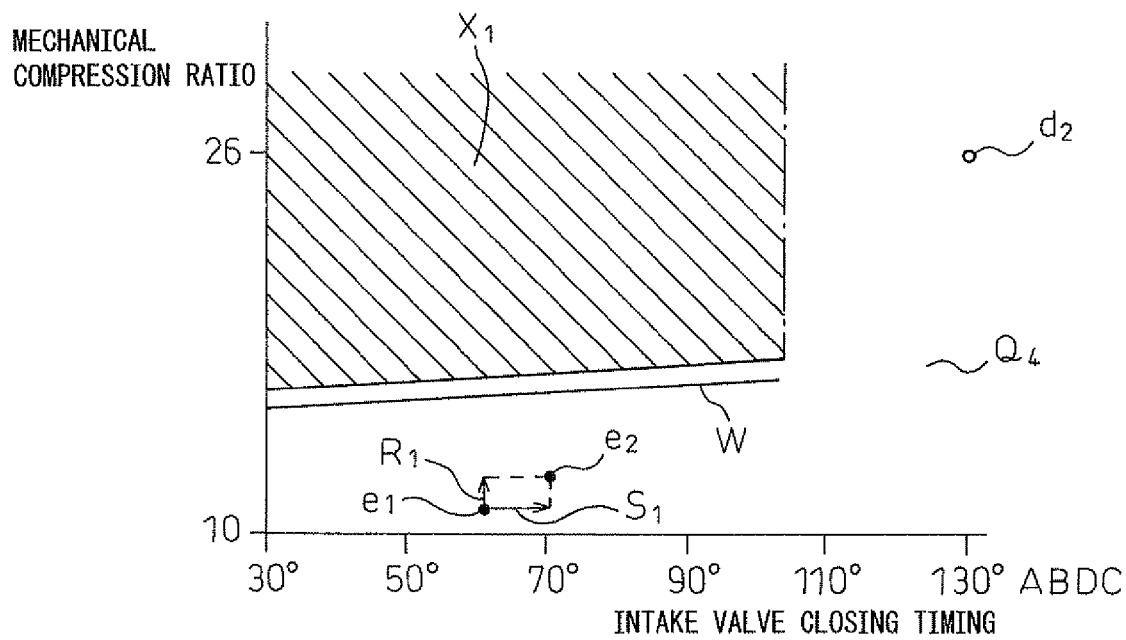
FIG. 32 is a view which shows a target operating point and an operating point.
Figure 33:
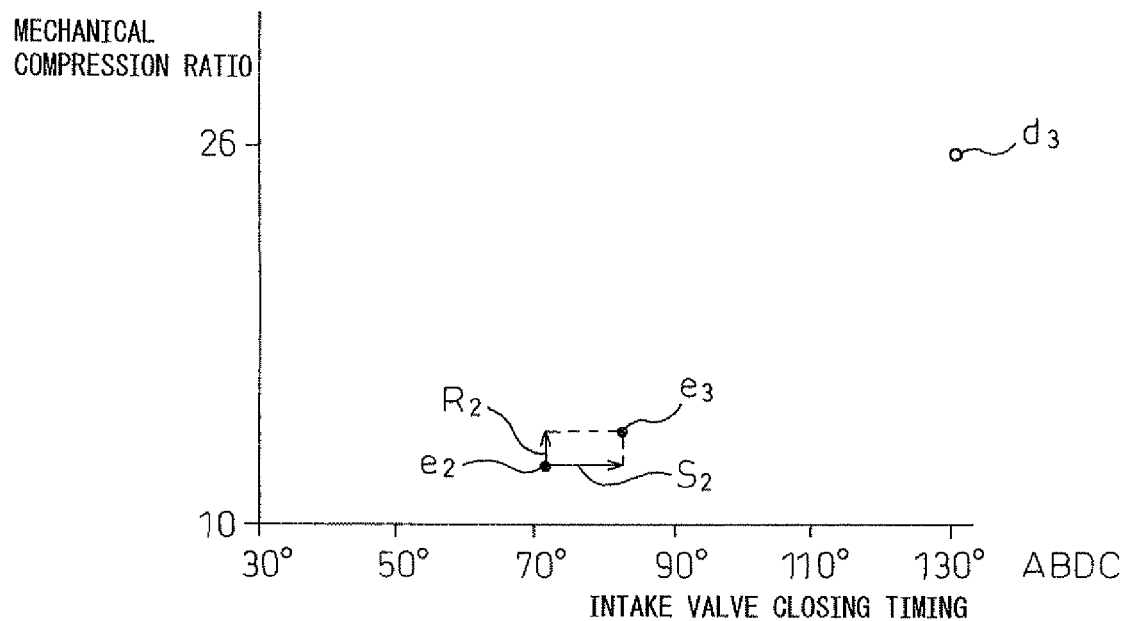
FIG. 33 is a view which shows a target operating point and an operating point.
Figure 34:
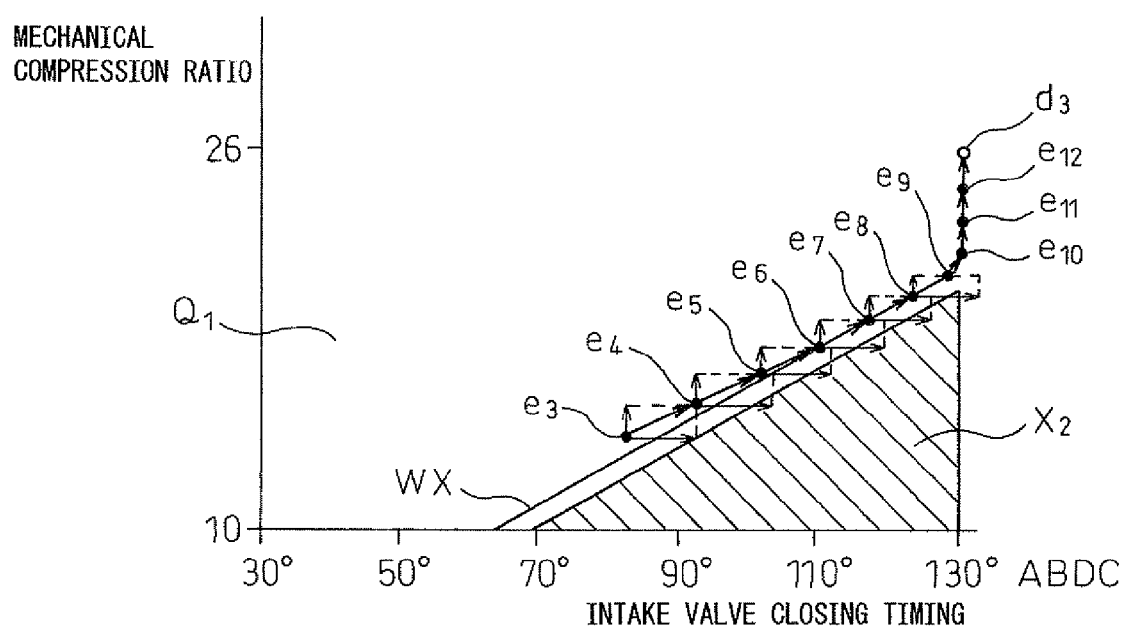
FIG. 34 is a view which shows a target operating point and an operating point.

Further, FIG. 31 shows the throttle full open plane $Q_6$, FIG. 32 shows the identical intake air amount plane where the intake air amount is $Q_4$, FIG. 33 shows the identical intake air amount plane where the intake air amount is a value between $Q_3$ and $Q_2$, and FIG. 34 shows the identical intake air amount plane where the intake air amount is $Q_1$.

Now then, when the mechanical compression ratio and the closing timing of the intake valve are held at the operating point "n" shown in FIG. 30, the demanded intake air amount changes from $Q_6$ to $Q_4$, and as a result, if the demanded operating point becomes $d_1$, first, as shown in FIG. 31, the target operating point $e_1$ on the throttle full open plane $Q_6$ is calculated. The method of calculation of this target operating point $e_1$ is the same as the method of calculation which is shown in FIG. 23. The target operating point $e_1$ which is closest to the demanded operating point $d_1$ without entering the no-entry region $X_1$ is calculated from the amount which the mechanical compression ratio can reach after a fixed time and the amount which the closing timing of the intake valve can reach after a fixed time. In the example which is shown in FIG. 31, this target operating point $e_1$ is positioned on the reference operating line W.

On the other hand, in the same way as the case which is shown in FIG. 22, the throttle valve 17 is made to close to the target opening degree which is required for making the amount of intake air the demanded intake air amount $Q_4$ without making the ratio of the target value for the mechanical compression ratio and the closing timing of the intake valve change, That is, in FIG. 30, the point on the identical intake air amount plane $Q_4$ which is positioned directly under the target operating point $e_1$ on the throttle full open plane $Q_6$ which is shown in FIG. 31 is made the final target operating point $e_1$. The final target operating point $e_1$ on the identical intake air amount plane $Q_4$ is shown in FIG. 30 and FIG. 32. The mechanical compression ratio, the closing timing of the intake valve, and the opening degree of the throttle valve 17 are made to change toward the final target operating point $e_1$. At this time, the mechanical compression ratio is made to increase, the closing timing of the intake valve is retarded, and the opening degree of the throttle valve 17 is made smaller than the full open state.

Next, if the demanded intake air amount becomes a value between $Q_3$ and $Q_2$ and the demanded operating point becomes $d_2$, this time, as shown in FIG. 32, the target operating point $e_2$ at the identical intake air amount plane at the current intake air amount $Q_4$ is calculated. The method of calculation of this target operating point $e_2$ is also the same as the method of calculation explained up to here. The target operating point $e_2$ which is the closest to the demanded operating point $d_2$ without entering the no-entry region $X_1$ is calculated from the amount of the mechanical compression ratio which can be reached after a fixed time and the amount of the closing timing of the intake valve which can be reached after a fixed time. In this case as well, in FIG. 30, the point on the identical intake air amount plane (value between $Q_3$ and $Q_2$) which is positioned directly under the target operating point $e_2$ on the identical intake air amount plane $Q_4$ which is shown in FIG. 32 is made the final target operating point $e_2$. The final target operating point $e_2$ on this identical intake air amount plane (value between $Q_3$ and $Q_2$) is shown in FIG. 30 and FIG. 33.

Next, when the demanded intake air amount becomes $Q_1$ and the demanded operating point becomes $d_3$, as shown in FIG. 33, the target operating point $e_3$ at the identical intake air amount plane (value between $Q_3$ and $Q_2$) is calculated, then the final target operating point $e_3$ at the identical intake air amount plane $Q_1$ is calculated as shown in FIG. 34. When the final target operating point $e_3$ is calculated, the mechanical compression ratio, the closing timing of the intake valve, and the opening degree of the throttle valve 17 are made to change toward the final target operating point $e_3$. At this time as well, the mechanical compression ratio is increased, the closing timing of the intake valve is retarded, and the opening degree of the throttle valve 17 is made smaller than the full open state.

In this regard, if the demanded intake air amount becomes smaller in this way, the low load side no-entry region $X_2$ appears in the identical intake air amount plane. The low load side no-entry region $X_2$ which appears in the identical intake air amount plane becomes larger the smaller the intake air amount. The low load side no-entry region $X_2$ which appears in the identical intake air amount plane, as shown in FIG. 34, becomes maximum when the demanded intake air amount becomes the minimum $Q_1$. Note that, in the embodiment according to the present invention, around this low load side no-entry region $X_2$, a no-entry plane is set in advance at a slight distance from the low load side no-entry region $X_2$ for preventing entry of the operating point into the low load side no-entry region $X_2$. A no-entry line of the intersection of this no-entry plane and the identical intake air amount plane is shown by WX in FIG. 34.

Now, in the embodiment according to the present invention, if the intake air amount becomes the demanded intake air amount $Q_1$, as shown in FIG. 34, the target operating points $e_4, e_5, e_6, e_7, e_8, e_9, e_{10}, e_{11}$, and $e_{12}$ which are the closest to the demanded operating point $d_3$ are successively calculated from the amount which the mechanical compression ratio can reach after a fixed time and the amount which the closing timing of the intake valve can reach after a fixed time on the identical intake air amount plane $Q_1$. In this case, when the target operating point which is closest to the demanded operating point $d_3$ is positioned at the opposite side from the non-entry region $X_2$ with respect to the no-entry line WX as the target operating point $e_4$, the calculated target operating point is made the target operating point $e_4$. As opposed to this, when the calculated target operating point which is closest to the demanded operating point $d_3$ is at the side closer to the no-entry region $X_2$ than the no-entry line WX, the points on the no-entry line WX becoming the limit reached by either the mechanical compression ratio or the closing timing of the intake valve are made the target operating point $e_5, e_6, e_7, e_8$, and $e_9$.

That is, if the demanded intake air amount becomes $Q_1$, the mechanical compression ratio, the closing timing of the intake valve, and the opening degree of the throttle valve 17 are made to change on the identical intake air amount plane $Q_1$ successively through the final operating points $e_4, e_5, e_6, e_7, e_8, e_9, e_{10}, e_{11}$, and $e_{12}$ until the demanded operating point $d_3$. During this time, the mechanical compression ratio is increased, the closing timing of the intake valve is retarded until reaching $e_{10}$, and the opening degree of the throttle valve 17 is gradually made larger.

Figure 35:
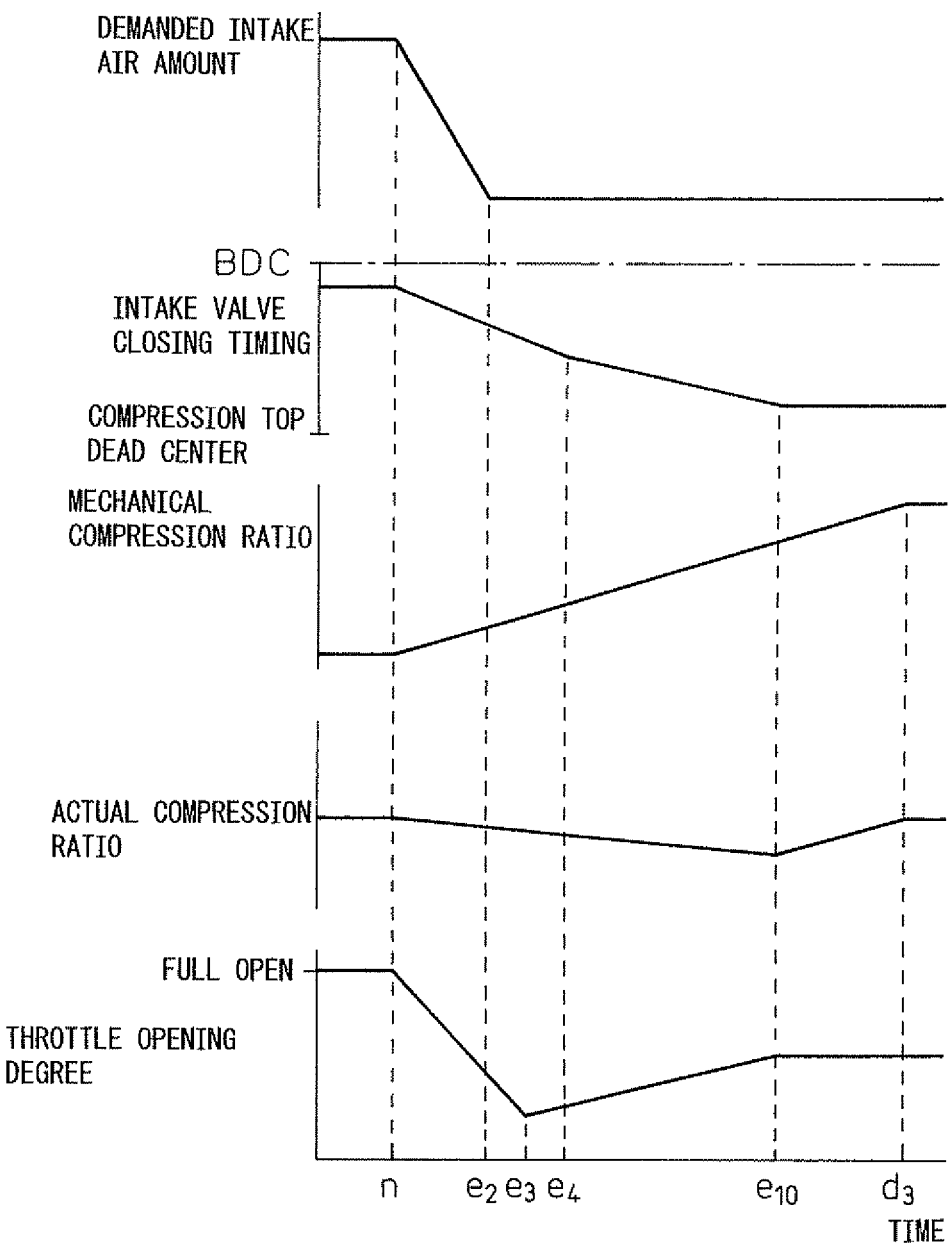
FIG. 35 is a time chart which shows changes in the mechanical compression ratio, the closing timing of the intake valve, and the throttle opening degree, etc.

FIG. 35 shows the changes in the closing timing of the intake valve, the mechanical compression ratio, the actual compression ratio, and the throttle opening degree in the case where, as shown in FIG. 30, the target intake air amount is made to rapidly decrease from $Q_6$ (point "n") to $Q_1$ (target operating point $d_3$). From FIG. 35, it is learned that, in this case, after the demanded intake air amount becomes the target value (operating point $e_2$), the action of retarding the closing timing of the intake valve is ended (operating point $e_{10}$), then the action of increasing the mechanical compression ratio is ended (target operating point $d_3$). On the other hand, the actual compression ratio is gradually decreased until the action of retarding the closing timing of the intake valve is ended (operating point $e_{10}$), then gradually rises. Further, the throttle opening degree is made to fall from the full open state until the operating point becomes the operating point $e_3$ on the identical intake air amount plane $Q_1$, then is made to gradually open until the action of retarding the closing timing of the intake valve is ended (operating point $e_{10}$).

Note that, when the demanded intake air amount changes, sometimes the opening degree of the throttle valve 17 which satisfies the demanded intake air amount becomes within the three-dimensional no-entry region, that is, within the low load side no-entry region $X_2$. In this case, the opening degree of the throttle valve 17 is made to change until the above-mentioned no-entry plane, that is, right before entering the three-dimensional no-entry region, then the operating point which shows the combination of the mechanical compression ratio, the closing timing of the intake valve, and the throttle opening degree is made to change without entering the three-dimensional no-entry region toward the operating point which satisfies the demanded intake air amount.

Figure 36:
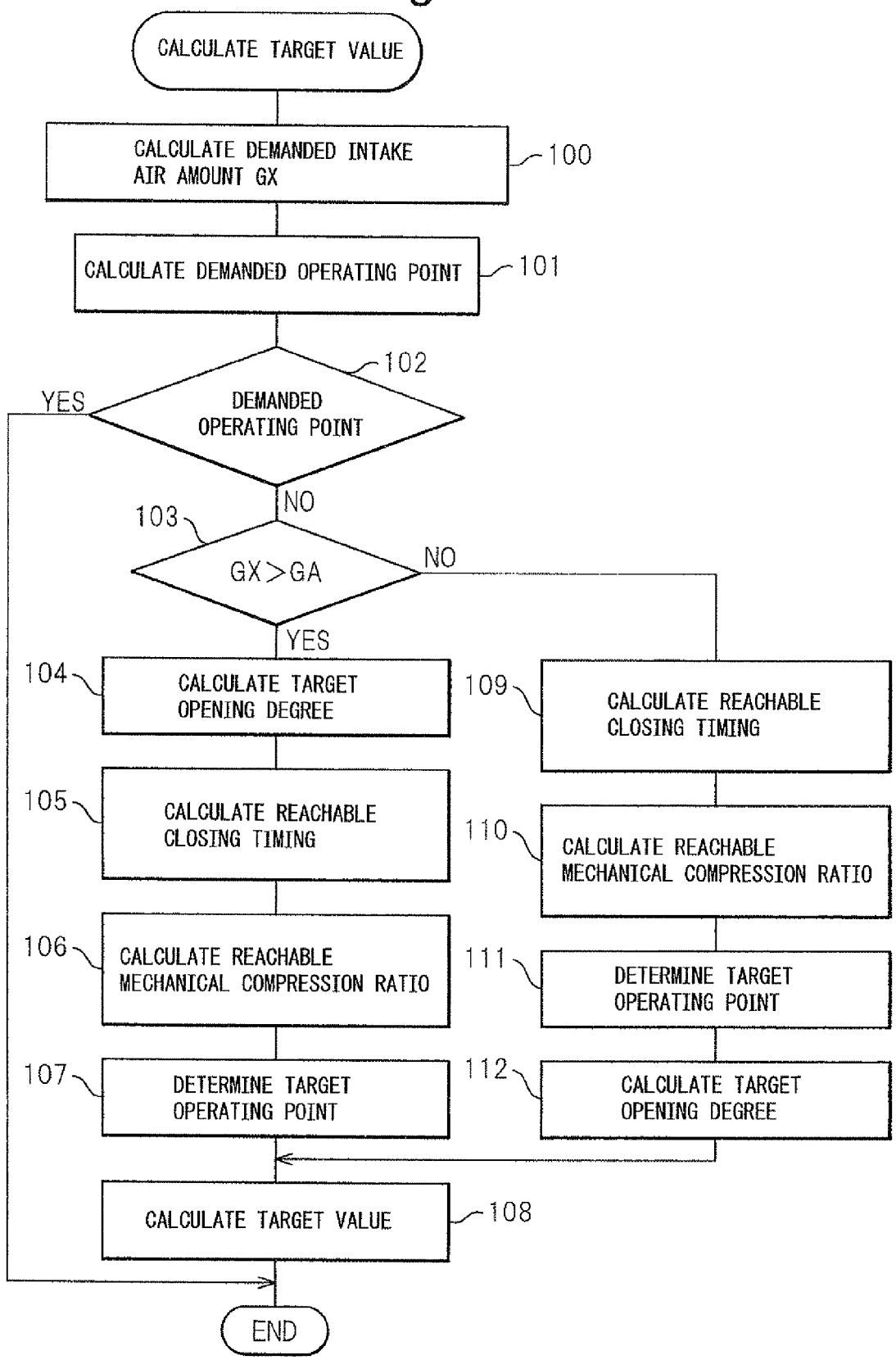
FIG. 36 is a flow chart for calculating a target value.

FIG. 36 shows the routine for calculation of the target operating point which can be reached after a predetermined fixed time from the current operating point, that is, the target values of the mechanical compression ratio, the closing timing of the intake valve, and throttle opening degree.

In this routine, the target operating point which can be reached after a predetermined fixed time is calculated every this predetermined fixed time period. Therefore, the routine which is shown in FIG. 36 is run every such predetermined fixed time period. This predetermined fixed time period can be arbitrarily set, but in the embodiment according to the present invention, this predetermined fixed time period is made 8 msec. Therefore, in this embodiment according to the present invention, the routine for calculation of the target value which is shown in FIG. 36 is executed every 8 msec. The target operating point which can be reached after 8 msec from the current operating point is calculated every 8 msec.

Referring to FIG. 36, first, at step 100, the demanded intake air amount GX is calculated. This demanded intake air amount GX, for example, is stored as a function of the amount of depression of the accelerator pedal 40 and the engine speed in advance in the ROM 32. Next, at step 101, the demanded operating point on the reference operating line W in accordance with the demanded intake air amount GX is calculated. Next, at step 102, it is judged if the current operating point is the demanded operating point. When the current operating point is the demanded operating point, the processing cycle is ended. As opposed to this, when the current operating point is not the demanded operating point, the routine proceeds to step 103 where it is judged if the demanded intake air amount GX is larger than the intake air amount GA at the current operating point.

Figure 15:
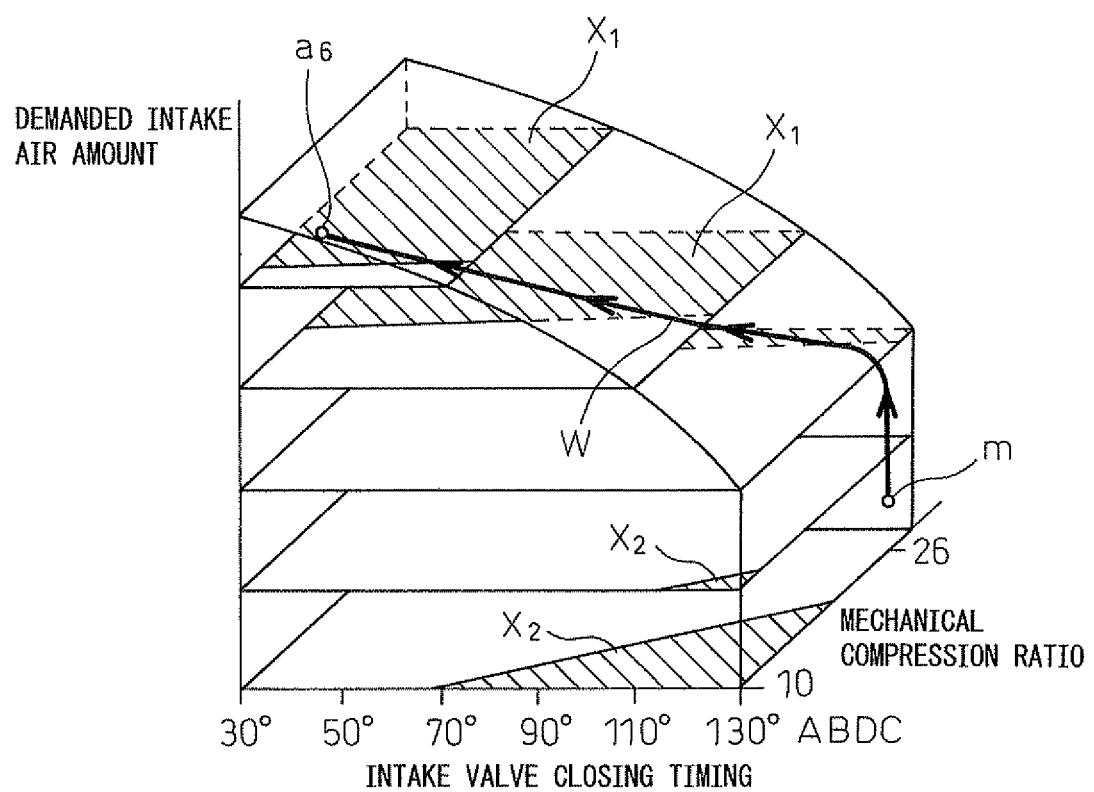
FIG. 15 is a view which shows changes in the mechanical compression ratio, the closing timing of the intake valve, and the throttle opening degree.

When GX>GA, that is, when increasing the intake air amount, the routine proceeds to step 104 where the target operating point is determined as explained based on FIG. 13 to FIG. 15. That is, at step 104, the target throttle opening degree in accordance with the demanded intake air amount GX is calculated. This target throttle opening degree is usually made the full open degree when the demanded operating point is positioned on the throttle full open plane $Q_6$. Next, at step 105, the closing timing of the intake valve which can be reached after a fixed time is calculated, next, at step 106, the mechanical compression ratio which can be reached after a fixed time is calculated. At this time, the mechanical compression ratio which can be reached after a fixed time is calculated while considering the changeable amount of the mechanical compression ratio which is explained with reference to FIG. 16 to FIG. 19.

Next, at step 107, the target operating point is determined by the method which is explained based on FIG. 14. Next, at step 108, the target value of the mechanical compression ratio and the target value of the closing timing of the intake valve are calculated from the determined target operating point. The target value of the throttle opening degree is already calculated as the target throttle opening degree at step 104.

On the other hand, when, at step 103, it is judged that GX≤GA, that is, when the intake air amount should be decreased or the intake air amount is equal to the demanded intake air amount, the routine proceeds to step 109 where the target operating point is determined in the manner as explained based on FIG. 20 to FIG. 35. That is, at step 109, the closing timing of the intake valve which can be reached after a fixed time is calculated, then, at step 110, the mechanical compression ratio which can be reached after a fixed time is calculated. At this time as well, the mechanical compression ratio which can be reached after a fixed time is calculated considering the changeable amount of the mechanical compression ratio which is explained with reference to FIG. 16 to FIG. 19.

Next, at step 112, the target throttle opening degree which satisfies the demanded intake air amount is calculated, then this target throttle opening degree is made the target value of the throttle opening degree. However, when the throttle opening degree which satisfies the demanded intake air amount GX becomes within the no-entry region, the target throttle opening degree is made the value of the no-entry plane explained above. As the mechanical compression ratio and the closing timing of the intake valve approach the demanded operating point, the target throttle opening degree is made to change along the no-entry plane.

Note that while not explained up to here, a similar thing can occur when the demanded intake air amount increases. For example, when the operating point is positioned in the region below the high load side no-entry region $X_1$ in FIG. 13, sometimes, if the demanded intake air amount increases, the target throttle opening degree becomes within the high load side no-entry region $X_1$. At this time, the target throttle opening degree is made a value on the reference operating plane including the reference operating lines W which are preset for the identical intake air amount planes. The target throttle opening degree is made to change along this reference operating plane as the mechanical compression ratio and the closing timing of the intake valve approach the demanded operating point.

Figure 37:
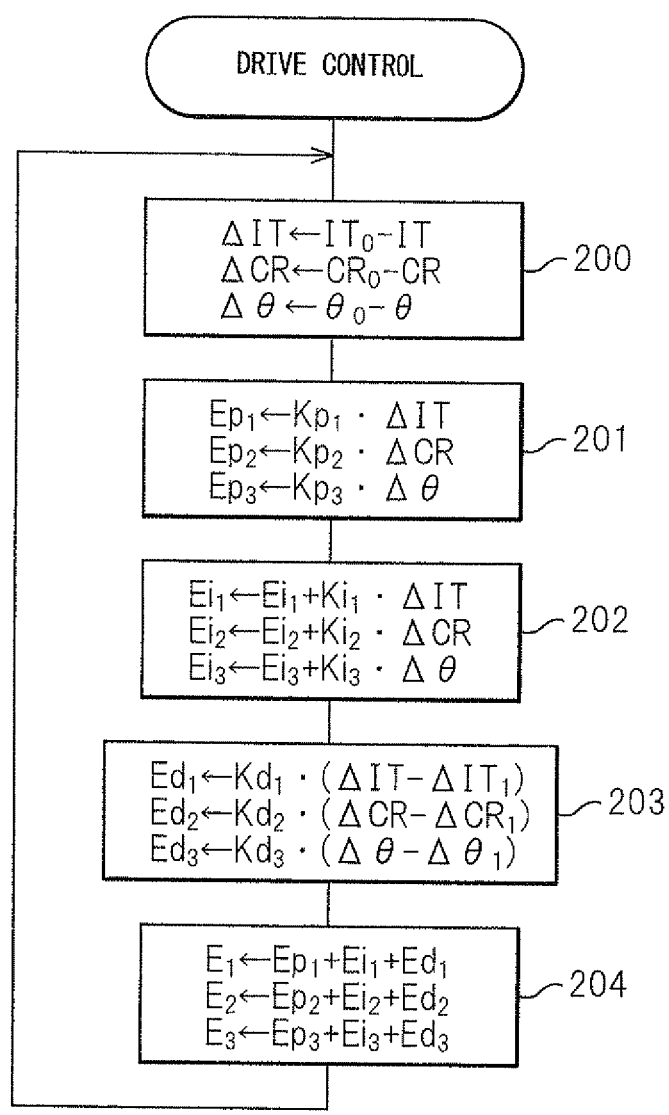
FIG. 37 is a flow chart for drive control of the variable compression ratio mechanism etc.

FIG. 37 shows the drive routine for driving the variable compression ratio mechanism A, variable valve timing mechanism B, and throttle valve 17 using PID control so that the mechanical compression ratio, the closing timing of the intake valve, and the throttle opening degree become the calculated target values in the routine shown from FIG. 36. This routine is repeatedly executed when the operation of the engine is started.

Referring to FIG. 37, at step 200, the difference $\Delta IT$ ($=IT_0-IT$) between the target value $IT_0$ of the closing timing of the intake valve and the current closing timing IT of the intake valve is calculated, the difference $\Delta CR$ ($=CR_0-CR$) between the target value $CR_0$ of the mechanical compression ratio and the current mechanical compression ratio CR is calculated, and the difference $\Delta\theta$ ($\theta_0-\theta$) between the target value $\theta_0$ of the throttle opening degree and the current throttle opening degree $\theta$ is calculated.

Next, at step 201, $\Delta IT$ is multiplied with the proportional constant $K_{p1}$ to calculate the proportional term $E_{p1}$ of the drive voltage for the variable valve timing mechanism B, $\Delta CR$ is multiplied with the proportional constant $K_{p2}$ to calculate the proportional term $E_{p2}$ of the drive voltage for the variable compression ratio mechanism A, and $\Delta\theta$ is multiplied with the proportional constant $K_{p3}$ to calculate the proportional term $E_{p3}$ of the drive voltage for the throttle valve 17.

Next, at step 202, $\Delta IT$ is multiplied with the integral constant $K_{i1}$ and this multiplication result ($K_{i1} \cdot \Delta IT$) is cumulatively added to calculate the integral term $E_{i1}$ of the drive voltage for the variable valve timing mechanism B, $\Delta CR$ is multiplied with the integral constant $K_{i2}$ and this multiplication result ($K_{i2} \cdot \Delta CR$) is cumulatively added to calculate the integral term $E_{i2}$ of the drive voltage for the variable compression ratio mechanism A, and $\Delta\theta$ is multiplied with the integral constant $K_{i3}$ and this multiplication result ($K_{i3} \cdot \Delta\theta$) is cumulatively added to calculate the integral term $E_{i3}$ of the drive voltage for the throttle valve 17.

Next, at step 203, the difference ($\Delta IT - \Delta IT_1$) between the current $\Delta IT$ and the previously calculated $\Delta IT_1$ is multiplied with the differential constant $K_{d1}$ to calculate the differential term $E_{d1}$ of the drive voltage for the variable valve timing mechanism B, the difference ($\Delta CR - \Delta CR_1$) between the current $\Delta CR$ and the previously calculated $\Delta CR_1$ is multiplied with the differential constant $K_{d2}$ to calculate the differential term $E_{d2}$ of the drive voltage for the variable compression ratio mechanism A, and the difference ($\Delta\theta - \Delta\theta_1$) between the current $\Delta\theta$ and the previously calculated $\Delta\theta_1$ is multiplied with the differential constant $K_{d3}$ to calculate the differential term $E_{d3}$ of the drive voltage for the throttle valve 17.

Next, at step 204, the proportional term $E_{p1}$, the integral term $E_{i1}$, and the differential term $E_{d1}$ are added to calculate the drive voltage $E_1$ for the variable valve timing mechanism B, the proportional term $E_{p2}$, the integral term $E_{i2}$, and the differential term $E_{d2}$ are added to calculate the drive voltage $E_2$ for the variable compression ratio mechanism A, and the proportional term $E_{p3}$, the integral term $E_{i3}$, and the differential term $E_{d3}$ are added to calculate the drive voltage $E_3$ for the throttle valve 17.

If the variable valve timing mechanism B, the variable compression ratio mechanism A, and the throttle valve 17 are driven in accordance with these drive voltages $E_1$, $E_2$, and $E_3$, the closing timing of the intake valve, the mechanical compression ratio, and the throttle opening degree are respectively changed toward the successively changing target values.

REFERENCE SIGNS LIST

1 . . . crankcase
2 . . . cylinder block
3 . . . cylinder head
4 . . . piston
5 . . . combustion chamber
7 . . . intake valve
17 . . . throttle valve
70 . . . intake valve drive-use camshaft
A . . . variable compression ratio mechanism
B . . . variable valve timing mechanism

The invention claimed is:
1. A spark ignition type internal combustion engine comprising:
   a variable compression ratio mechanism which can change a mechanical compression ratio;
   a variable valve timing mechanism which can control a closing timing of an intake valve; and
   an electronic control unit that includes control logic, which when executed:
      determines when a demanded intake air amount changes,
      determines an operating point for the mechanical compression ratio and the closing timing of the intake valve that satisfies the changed demanded intake air amount, and
      repeatedly determines successive target operating points that can be reached after successive fixed times in order to move the mechanical compression ratio and the closing timing of the intake valve without entering a non-entry region for a combination of the mechanical compression ratio and the closing timing of the intake valve,
      wherein the successive target operating points are between a current operating point for the mechanical compression ratio and the closing timing of the intake valve and the operating point that satisfies the changed demanded intake air amount, and wherein the successive target operating points are repeatedly determined until the mechanical compression ratio and the closing timing of the intake value reach the operating point that satisfies the changed demanded intake air amount.

2. A spark ignition type internal combustion engine as claimed in claim 1 wherein said successive target operating points are made operating points that are the furthest from the current operating point among the operating points which can be reached after a fixed time without entering said no-entry region from the current operating point to the operating point which satisfies the changed demanded intake air amount.

3. A spark ignition type internal combustion engine as claimed in claim 2 wherein a throttle valve for controlling an intake air amount is provided and, when the throttle valve is maintained in a full open state, said successive target operating points are made to move on a minimum fuel consumption operating line which extends outside of said no-entry region along an outer edge of said no-entry region.

4. A spark ignition type internal combustion engine as claimed in claim 1 wherein said variable compression ratio mechanism makes a relative position between a crankcase and cylinder block change by a crank mechanism using a rotating cam so as to make the mechanical compression ratio change, and a value of the mechanical compression ratio which can be reached after a fixed time is changed in accordance with the engine load when the demanded intake air amount changes.

5. A spark ignition type internal combustion engine as claimed in claim 4 wherein the value of the mechanical compression ratio which can be reached after a fixed time is changed in accordance with a rotational angle of said cam when the demanded intake air amount changes.

6. A spark ignition type internal combustion engine as claimed in claim 1 wherein two regions of a high load side region and a low load side region are set as no-entry regions.

7. A spark ignition type internal combustion engine as claimed in claim 1 wherein:

a throttle valve for controlling an intake air amount is provided, a three-dimensional no-entry region is set for a combination of the mechanical compression ratio, the closing timing of the intake valve, and throttle opening degree, successive target operating points which can be reached after successive fixed times without entering said three-dimensional no-entry region from the current operating point toward the operating point which satisfies the changed demanded intake air amount is determined for the mechanical compression ratio and the closing timing of the intake valve when the demanded intake air amount changes, and the mechanical compression ratio and the closing timing of the intake valve are made to change with the successive target operating points, and at this time, the throttle opening degree is made to change in accordance with the demanded intake air amount so as not to enter said three-dimensional no-entry region.

8. A spark ignition type internal combustion engine as claimed in claim 7 wherein said successive target operating points are made operating points that are the furthest from the current operating point among the operating points which can be reached after a fixed time without entering said three-dimensional no-entry region from the current operating point to the operating point which satisfies the changed demanded intake air amount.

9. A spark ignition type internal combustion engine as claimed in claim 7 wherein:

the successive target operating points which can be reached after the successive fixed times without entering the no-entry region at the current intake air amount from the current operating point toward the operating point which satisfies the changed demanded intake air amount is calculated for the mechanical compression ratio and the closing timing of the intake valve when the demanded intake air amount changes, the mechanical compression ratio and the closing timing of the intake valve are made to change with the successive target operating points, and a target opening degree which satisfies the demanded intake air amount at the successive target operating points is calculated for the throttle opening degree, and the throttle opening degree is made to change insofar as said target opening degree is not in said three-dimensional no-entry region.

10. A spark ignition type internal combustion engine as claimed in claim 7 wherein the throttle opening degree is made to change until right before entering said three-dimensional no-entry region when a throttle opening degree which satisfies the demanded intake air amount would become in said three-dimensional no-entry region when the demanded intake air amount changes, then the operating point which shows the combination of the mechanical compression ratio, the closing timing of the intake valve, and the throttle opening degree is made to change without entering said three-dimensional no-entry region toward the operating point which satisfies the changed demanded intake air amount.

* * * * *